United States Patent
Katrak

(10) Patent No.: US 9,935,552 B2
(45) Date of Patent: Apr. 3, 2018

(54) CONTROL SYSTEM FOR CONTROLLING OPERATIONAL MODES OF A DC-DC VOLTAGE CONVERTER

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/651,005

(22) Filed: Jul. 17, 2017

(65) Prior Publication Data

US 2018/0054123 A1 Feb. 22, 2018

Related U.S. Application Data

(60) Provisional application No. 62/376,565, filed on Aug. 18, 2016.

(51) Int. Cl.
- H02M 3/158 (2006.01)
- H02M 3/335 (2006.01)
- H02J 7/00 (2006.01)

(52) U.S. Cl.
CPC ......... H02M 3/1582 (2013.01); H02J 7/0065 (2013.01); H02M 3/1584 (2013.01); H02M 3/33584 (2013.01)

(58) Field of Classification Search
CPC .... H02M 3/156; H02M 3/158; H02M 3/1582; H02M 3/1584; H02M 3/33507; H02M 3/33584; H02M 2003/156; H02M 2003/158; H02M 2003/1584; H02J 7/0065

See application file for complete search history.

(56) References Cited

U.S. PATENT DOCUMENTS

| | | | | |
|---|---|---|---|---|
| 6,137,280 | A * | 10/2000 | Ackermann | H02J 7/0008 323/224 |
| 7,317,265 | B2 * | 1/2008 | Chian | H02J 7/34 136/205 |
| 7,557,459 | B2 * | 7/2009 | Yamashita | B60L 1/00 307/9.1 |
| 7,923,865 | B2 | 4/2011 | Melse | |
| 8,587,283 | B2 | 11/2013 | Wu | |
| 8,907,642 | B1 | 12/2014 | Burstein et al. | |

(Continued)

FOREIGN PATENT DOCUMENTS

| | | |
|---|---|---|
| JP | 4630173 B2 | 2/2011 |
| KR | 20120092681 A | 8/2012 |
| KR | 101283256 B1 | 7/2013 |

Primary Examiner — Matthew Nguyen
(74) Attorney, Agent, or Firm — Buckert Patent & Trademark Law Firm PC; John F. Buckert

(57) ABSTRACT

A control system for controlling operational modes of a DC-DC voltage converter is provided. The DC-DC voltage converter initially has an idle operational mode. The microcontroller having first and second operational mode applications. The first operational mode application determines a first encoded value based on the first operational mode value, and further determines first and second values based on the first encoded value. The second operational mode application determines a second encoded value based on the first operational mode value, and further determines third and fourth values based on the second encoded value. The first operational mode application induces the DC-DC voltage converter to transition to the first operational mode if the second value is equal to the third value.

16 Claims, 16 Drawing Sheets

(56) References Cited

U.S. PATENT DOCUMENTS

| | | |
|---|---|---|
| 2010/0202161 A1 | 8/2010 | Sims et al. |
| 2011/0128761 A1 | 6/2011 | Ripley et al. |
| 2011/0301811 A1* | 12/2011 | Boissiere .............. H02J 7/0065 |
| | | 701/36 |
| 2015/0102672 A1* | 4/2015 | Matsumoto ............. H02M 1/08 |
| | | 307/31 |
| 2016/0118900 A1 | 4/2016 | Nate et al. |

* cited by examiner

FIRST MODE TABLE 250

| OPERATIONAL MODE | DECIMAL | HEXADECIMAL | |
|---|---|---|---|
| IDLE | 0 | FB | 251 |
| BUCK | 1 | 1D | 252 |
| BUCK SPECIAL | 4 | 7D | 253 |
| BOOST | 5 | BC | 254 |
| OFF | 8 | A5 | 255 |

FIG. 2

FIRST CHECK TABLE 280

| OPERATIONAL MODE | HEXADECIMAL | HEXADECIMAL | |
|---|---|---|---|
| IDLE | FB | 01 | 281 |
| BUCK | 1D | B8 | 282 |
| BUCK SPECIAL | 7D | D8 | 283 |
| BOOST | BC | 14 | 284 |
| OFF | A5 | 5A | 285 |

FIG. 3

SECOND MODE TABLE 350

| OPERATIONAL MODE | DECIMAL | HEXADECIMAL | |
|---|---|---|---|
| IDLE | 0 | 01 | 351 |
| BUCK | 1 | B8 | 352 |
| BUCK SPECIAL | 4 | D8 | 353 |
| BOOST | 5 | 14 | 354 |
| OFF | 8 | 5A | 355 |

FIG. 4

SECOND CHECK TABLE 480

| OPERATIONAL MODE | HEXADECIMAL | HEXADECIMAL | |
|---|---|---|---|
| IDLE | 01 | FB | 481 |
| BUCK | B8 | 1D | 482 |
| BUCK SPECIAL | D8 | 7D | 483 |
| BOOST | 14 | BC | 484 |
| OFF | 5A | A5 | 485 |

FIG. 5

CONTROL SYSTEM FOR CONTROLLING OPERATIONAL MODES OF A DC-DC VOLTAGE CONVERTER

CROSS-REFERENCE TO RELATED APPLICATION

This application claims priority to U.S. Provisional Patent Application No. 62/376,565 filed on Aug. 18, 2016, the entire contents of which are hereby incorporated by reference herein.

BACKGROUND

The inventor herein has recognized a need for an improved control system for controlling operational modes of a DC-DC voltage converter. In particular, the inventor herein has recognized that it would advantageous to have a control system with a microcontroller that utilizes first and second operational mode applications that can each confirm that the DC-DC voltage converter should be transitioned to a desired operational mode and that can each transition the DC-DC voltage converter to the desired operational mode.

SUMMARY

A control system for controlling operational modes of a DC-DC voltage converter in accordance with an exemplary embodiment is provided. The DC-DC voltage converter has a first bi-directional switch and a second bi-directional switch. The DC-DC voltage converter initially has an idle operational mode. The control system includes a microcontroller receiving a first operational mode message from a communication bus. The first operational mode message has a first operational mode value therein indicating that the DC-DC voltage converter is being commanded to transition to a first operational mode. The first operational mode is not the idle operational mode. The microcontroller having a first operational mode application and a second operational mode application. The first operational mode application determines a first encoded value based on the first operational mode value, and further determines first and second values based on the first encoded value. The second operational mode application determines a second encoded value based on the first operational mode value, and further determines third and fourth values based on the second encoded value. The second encoded value is different than the first encoded value. The first operational mode application induces the DC-DC voltage converter to transition from the idle operational mode to the first operational mode if the second value is equal to the third value. The second operational mode application induces the DC-DC voltage converter to transition from the idle operational mode to the first operational mode if the first value is equal to the fourth value.

BRIEF DESCRIPTION OF THE DRAWINGS

FIG. 2 is a first mode table utilized by a first operational mode application in the control system of FIG. 1;

FIG. 3 is a first check table utilized by the first operational mode application in the control system of FIG. 1;

FIG. 4 is a second mode table utilized by a second operational mode application in the control system of FIG. 1;

FIG. 5 is a second check table utilized by the second operational mode application in the control system of FIG. 1;

DETAILED DESCRIPTION

Figure 1:
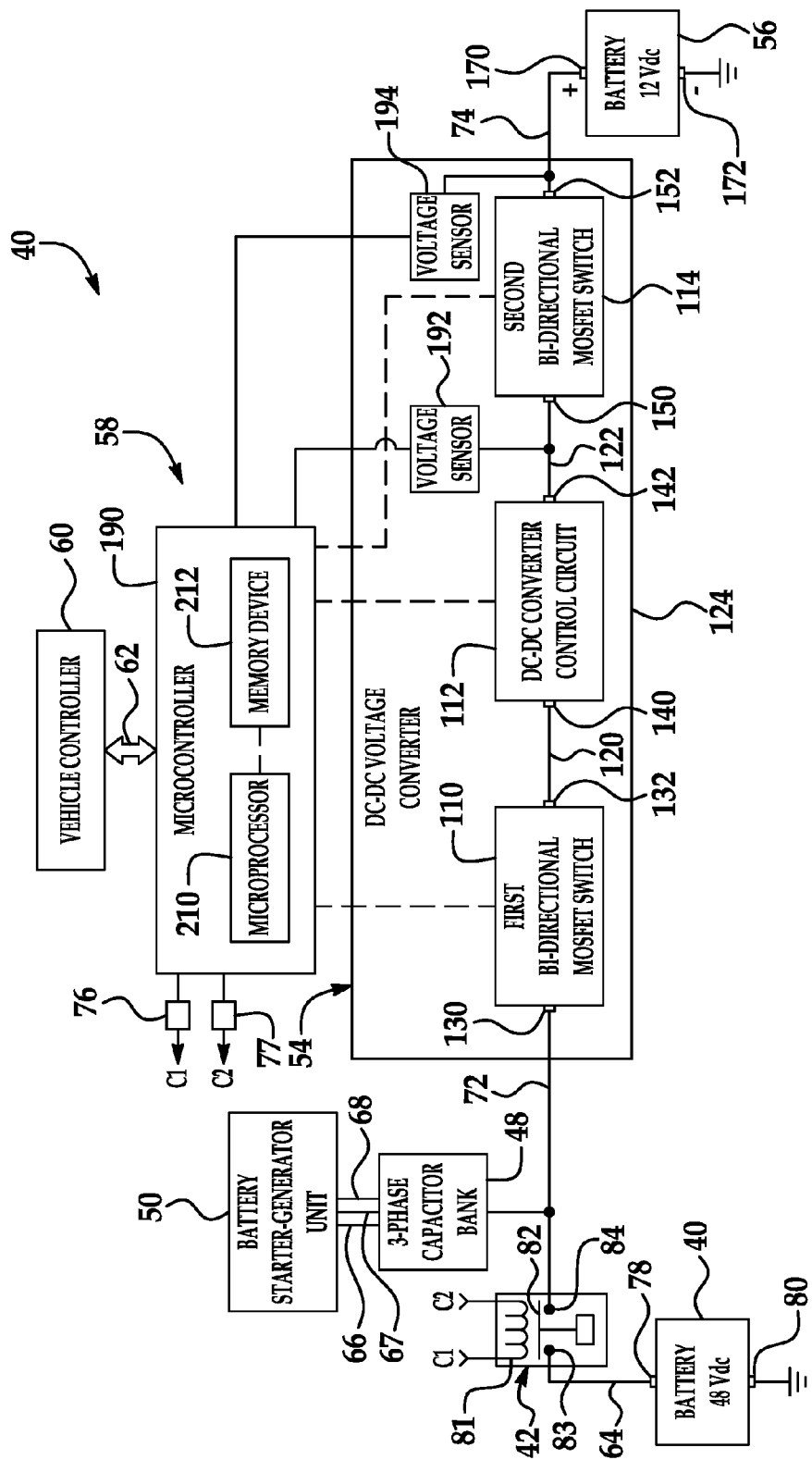
FIG. 1 is a schematic of a vehicle having a control system for a DC-DC voltage converter in accordance with an exemplary embodiment.

Referring to FIG. 1, a vehicle 10 is provided. The vehicle 10 includes a battery 40, a contactor 42, a 3-phase capacitor bank 48, a battery-starter generator unit 50, a DC-DC voltage converter 54, a battery 56, a control system 58, a vehicle controller 60, a communication bus 62, and electrical lines 64, 66, 67, 68, 72, 74.

An advantage of the control system 58 is that the control system 58 has a microcontroller 190 that utilizes first and second operational mode applications 618, 619 that can each confirm that the DC-DC voltage converter 54 should be transitioned to a desired operational mode and that can each transition the DC-DC voltage converter 54 to the desired operational mode.

For purposes of understanding, a node is a region or a location in an electrical circuit.

The battery 40 includes a positive terminal 78 and a negative terminal 80. In an exemplary embodiment, the battery 40 generates 48 Vdc between the positive terminal 78 and the negative terminal 80. The positive terminal 78 is electrically coupled to a first node 83 on a first side of the contactor 42. The negative terminal 80 is electrically coupled to an electrical ground.

The contactor 42 has a contactor coil 81, a contact 82, a first node 83 and a second node 84. The first node 83 is electrically coupled to the positive terminal 78 of the battery 40. The second node 84 is electrically coupled to both the 3-phase capacitor bank 48 and the first node 130 of the first bi-directional MOSFET switch 110. When the microcontroller 190 generates first and second control signals that are received by the voltage drivers 76, 77, respectively, the contactor coil 81 is energized which transitions the contact 82 to a closed operational state. Alternately, when the microcontroller 190 generates third and fourth control signals that are received by the voltage drivers 76, 77, respectively, the contactor coil 81 is de-energized which transitions the contact 82 to an open operational state. In an exemplary embodiment, the third and fourth control signals can each be a ground voltage level.

The 3-phase capacitor bank 48 is utilized to store and release electrical energy from the battery starter-generator unit 50, the battery 40, and the DC-DC voltage converter 54. The 3-phase capacitor bank 48 is electrically coupled to the node 82 and the first node 30 of the first bi-directional MOSFET switch 130 utilizing the electrical line 72. The 3-phase capacitor bank 48 is electrically coupled to the battery-starter generator 50 utilizing the electrical lines 66, 67, 68.

The battery-starter generator unit 50 is provided to generate an AC voltage that is received by the 3-phase capacitor bank 48 via the electrical lines 66, 67, 68.

The DC-DC voltage converter 54 includes a first bi-directional MOSFET switch 110, a DC-DC converter control circuit 112, and a second bi-directional MOSFET switch 114, electrical lines 120, 122, and a housing 124. The housing 124 holds the first bi-directional MOSFET switch 110, the DC-DC converter control circuit 112, and the second bi-directional MOSFET switch 114 therein.

Figure 20:
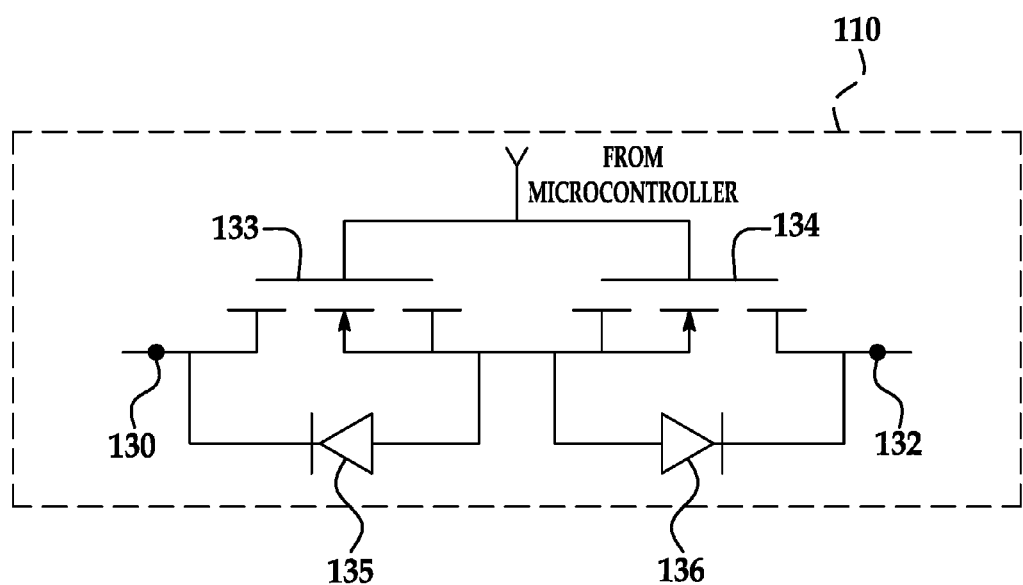
FIG. 20 is a schematic of a first bi-directional MOSFET switch utilized in the DC-DC voltage converter of FIG. 1.

Referring to FIGS. 1 and 20, in an exemplary embodiment, the first bi-directional MOSFET switch 110 includes a first node 130, a second node 132, MOSFET switches 133, 134, and diodes 135, 136. Of course, in an alternative embodiment, the first bi-directional MOSFET switch 110 could be replaced with another type of bi-directional switch having desired voltage and current capabilities. The first node 130 is electrically coupled to the second node 84 of the contactor 42, and to the 3-phase capacitor bank 48. The second node 132 is electrically coupled to a first node 140 of the DC-DC converter control circuit 112. When the microcontroller 190 generates a first control signal that is received by the first bi-directional MOSFET switch 110 (or that is received by a controller or a microprocessor within the DC-DC voltage converter 54 that is operably coupled to the switch 110), the microcontroller 190 induces the switch 110 to transition to a closed operational state. When the microcontroller 190 generates a second control signal, the microcontroller 190 induces the switch 110 to transition to an open operational state. In an exemplary embodiment, the second control signal is a ground level control signal.

The DC-DC converter control circuit 112 has a first node 140 and a second node 142. The DC-DC converter control circuit 112 can convert a DC voltage received at the first node 140 to another DC voltage output at the second node 142, based on a first control signal from the microcontroller 190. Alternately, the DC-DC converter control circuit 112 can convert a DC voltage received at the second node 142 to another DC voltage that is output at the first node 140, based on a second control signal from the microcontroller 190.

The second bi-directional MOSFET switch 114 includes a first node 150 and a second node 152. The first node 150 is electrically coupled to the second node 142 of the DC-DC converter control circuit 112 utilizing the electrical line 122. The second node 152 is electrically coupled to the battery 56 utilizing the electrical line 74. In an exemplary embodiment, the second bi-directional MOSFET switch 114 has an identical structure as the first bi-directional MOSFET switch 110. Of course, in an alternative embodiment, the second bi-directional MOSFET switch 114 could be replaced with another type of bi-directional switch having desired voltage and current capabilities. When the microcontroller 190 generates a first control signal that is received by the second bi-directional MOSFET switch 114 (or that is received by a controller or a microprocessor within the DC-DC voltage converter 54 that is operably coupled to the switch 114), the microcontroller 190 induces the switch 114 to transition to a closed operational state. When the microcontroller 190 generates a second control signal, the microcontroller 190 induces the switch 114 to transition to an open operational state. In an exemplary embodiment, the second control signal is a ground level control signal.

The battery 56 includes a positive terminal 170 and a negative terminal 172. In an exemplary embodiment, the battery 56 generates 12 Vdc between the positive terminal 170 and the negative terminal 172. The positive terminal 170 is electrically coupled to the node 152 of the second bi-directional MOSFET switch 114. The negative terminal 182 is electrically coupled to an electrical ground, which may be different that the electrical ground that the battery 40 is coupled to.

Referring to FIG. 1, the control system 58 is utilized to control the operational modes of the DC-DC voltage converter 54. The control system 58 includes the contactor 42, the microcontroller 190, and voltage sensors 192, 194.

The microcontroller 190 includes a microprocessor 210 and a memory 212. The microcontroller 190 is programmed to control the operational modes of the DC-DC voltage converter 54 (described in flowcharts herein) which executes software instructions stored in the memory device 212, and stores values in the memory device 212. The microprocessor 190 is operably coupled to the memory device 212, the first and second bi-directional MOSFET switches 110, 114, the DC-DC converter control circuit 112, the voltage sensors 192, 194, and the contactor 42.

The voltage sensor 192 is electrically coupled to the first node 150 of the second bi-directional MOSFET switch 114 on a high voltage end of the switch 114. The voltage sensor 192 generates a first voltage signal that is indicative of a voltage level at the first node 150, which is received by the microcontroller 190.

The voltage sensor 194 is electrically coupled to the second node 152 of the second bi-directional MOSFET switch 114 on a low voltage end of the switch 114. The voltage sensor 194 generates a second voltage signal that is indicative of a voltage level at the second node 152, which is received by the microcontroller 190.

Figure 6:
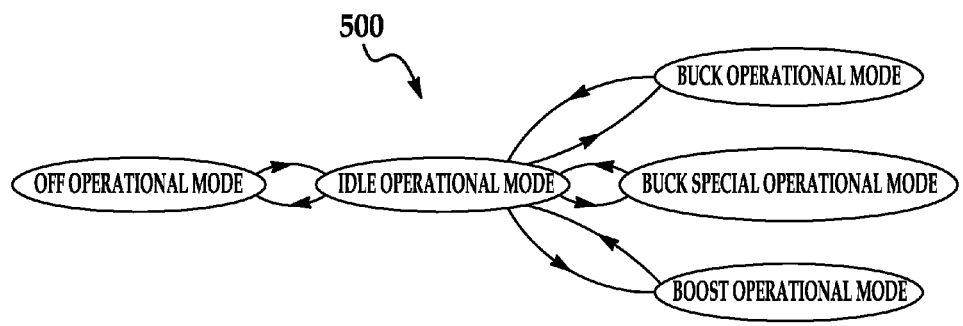
FIG. 6 is a state diagram illustrating the operational modes of the DC-DC voltage converter shown in FIG. 1.

Referring to FIGS. 1 and 6, the operational modes of the DC-DC voltage converter 54 will now be explained. In particular, referring to the state diagram 500, the DC-DC voltage converter 54 can be in one of the following operational modes: idle operational mode, buck operational mode, buck special operational mode, boost operational mode, and off operational mode.

Initially, the DC-DC voltage converter 54 is in the idle operational mode. When the DC-DC voltage converter 54 is in the idle operational mode, the first and second bi-directional MOSFET switches 110, 114 each have an open operational state, and the contact 82 of the contactor 42 has a closed operational state—such that an electrical current does not flow through the switches 110, 114. The DC-DC voltage converter 54 can selectively transition from the idle operational state to any of the other operational states. In an alternative embodiment, when the DC-DC voltage converter 54 is in the idle operational mode, the first and second bi-directional MOSFET switches 110, 114 each have an open operational state, and the contact 82 of the contactor 42 has an open operational state.

When the DC-DC voltage converter 54 is in the buck operational mode, the first and second bi-directional MOSFET switches 110, 114 each have a closed operational state, and the contact 82 of the contactor 42 has a closed operational state—such that the DC-DC voltage converter 54 applies an output voltage to the battery 56. Further, when the DC-DC voltage converter 54 transitions out of the buck operational mode, the DC-DC voltage converter 54 can only transition to the idle operational mode.

When the DC-DC voltage converter 54 is in the buck special operational mode, the first and second bi-directional MOSFET switches 110, 114 each have a closed operational state, and the contact 82 of the contactor 42 has an open operational state—such that the battery 40 is electrically de-coupled from the DC-DC voltage converter 54. Further, when the DC-DC voltage converter 54 transitions out of the buck special operational mode, the DC-DC voltage converter 54 can only transition to the idle operational mode.

When the DC-DC voltage converter 54 is in the boost operational mode, the first and second bi-directional MOSFET switches 110, 114 each have a closed operational state, and the contact 82 of the contactor 42 has an open operational state—such that the DC-DC voltage converter 54 charges the 3-phase capacitor bank 48. Further, when the DC-DC voltage converter 54 transitions out of the boost operational mode, the DC-DC voltage converter 54 can only transition to the idle operational mode.

When the DC-DC voltage converter 54 is in the off operational mode, the first and second bi-directional MOSFET switches 110, 114 each have an open operational state, and the contact 82 of the contactor 42 has an open operational state. Further, when the DC-DC voltage converter 54 transitions out of the off operational mode, the DC-DC voltage converter 54 can only transition to the idle operational mode.

Referring to FIGS. 1-5, an explanation of a first mode table 250, a first check table 280, a second mode table 350, and a second check table 480 stored in the memory device 212 and utilized by the microcontroller 190 for determining whether a valid request has been received to transition the DC-DC voltage converter 54 to a specific operating mode will be provided.

Referring to FIGS. 1 and 2, the first mode table 250 is utilized by a first operational mode application 618 to convert a received decimal mode value in an operational mode message from a vehicle controller 60 to an encoded mode value. The first mode table 250 includes the records 251, 252, 253, 254, 255.

Figure 7:
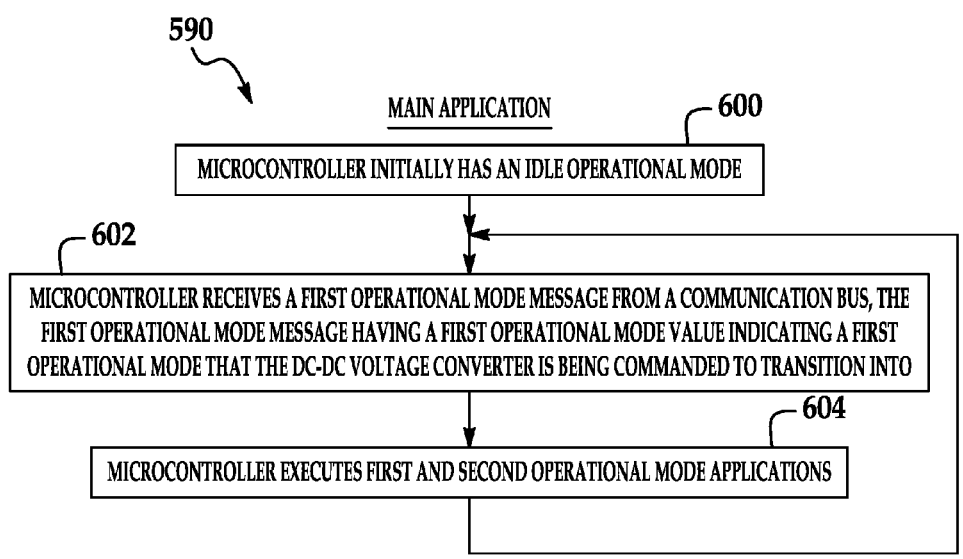
FIG. 7 is a flowchart of a main application utilized by the control system of FIG. 1 for controlling operational modes of the DC-DC voltage converter.
Figure 8:
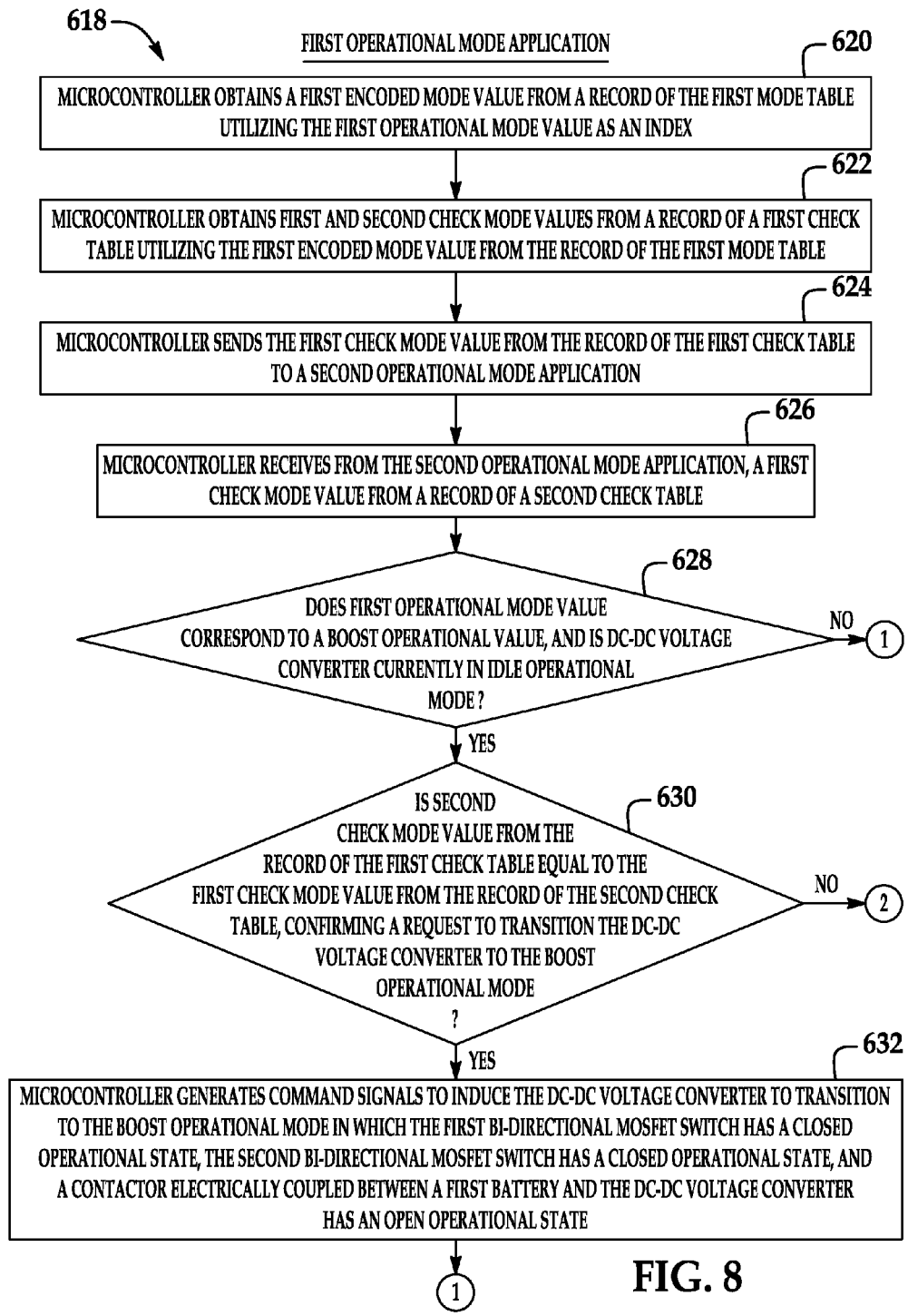
FIGS. 8-13 is a flowchart of a first operational mode application utilized by the main application of FIG. 7.
Figure 9:
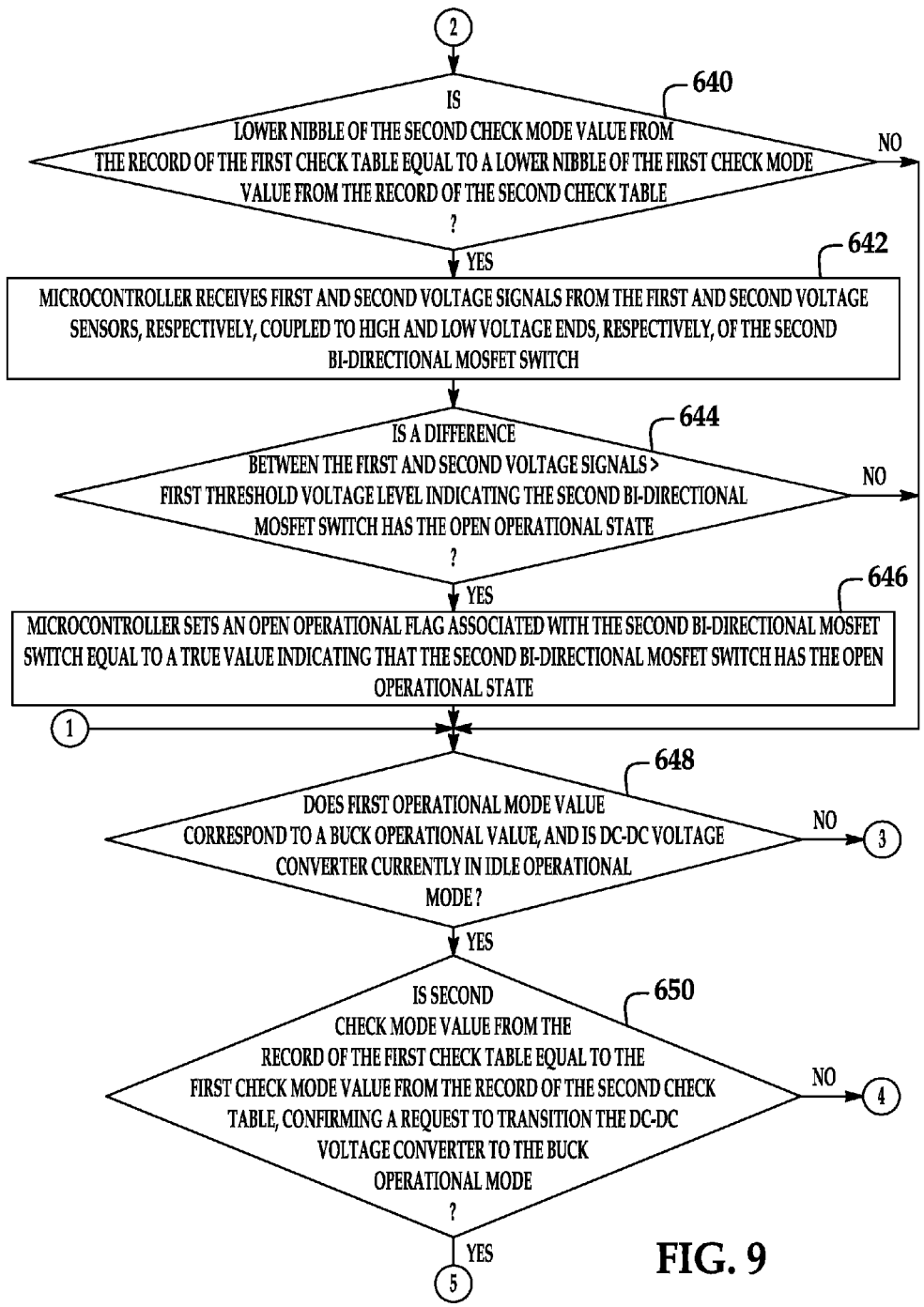
Figure 10:
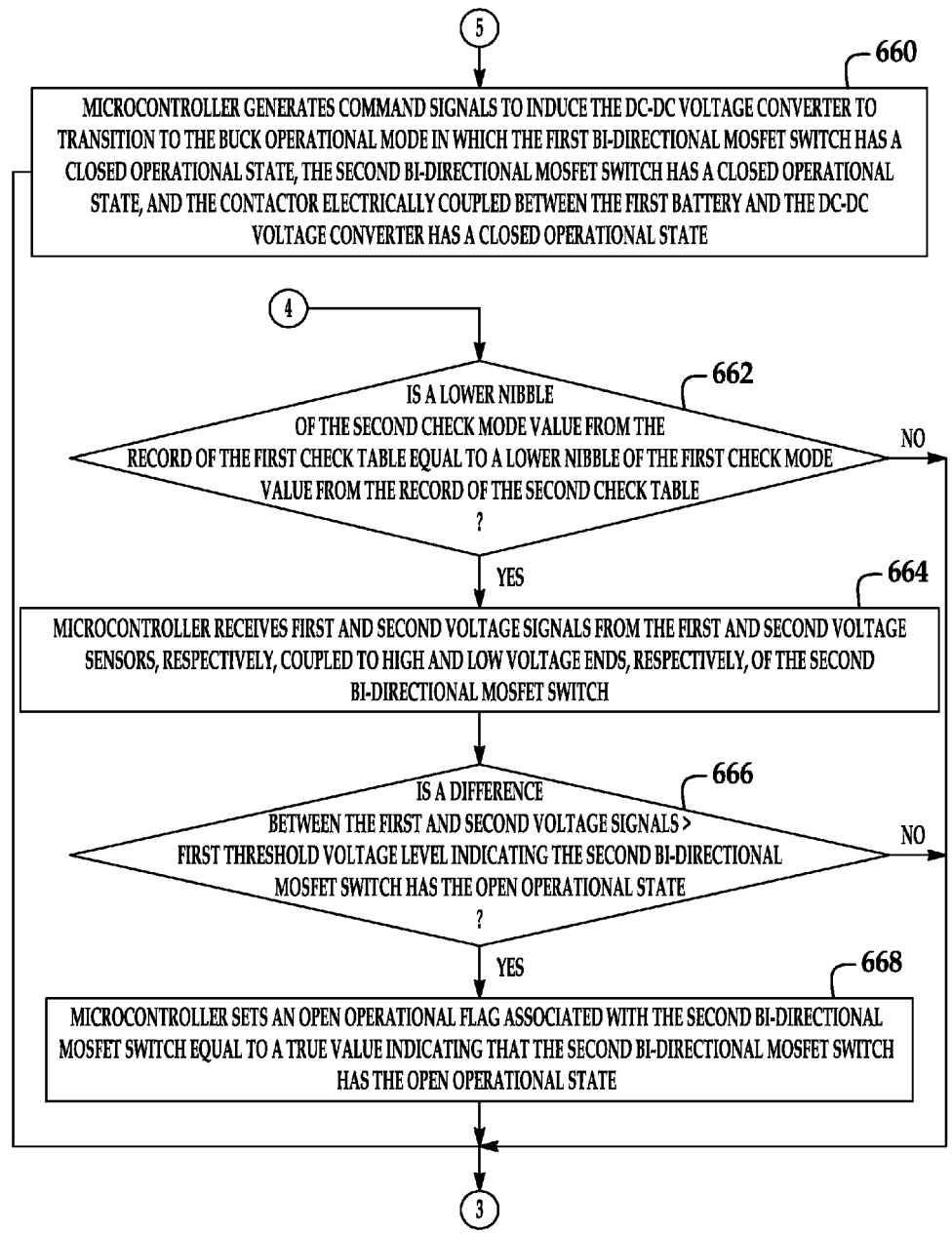
Figure 11:
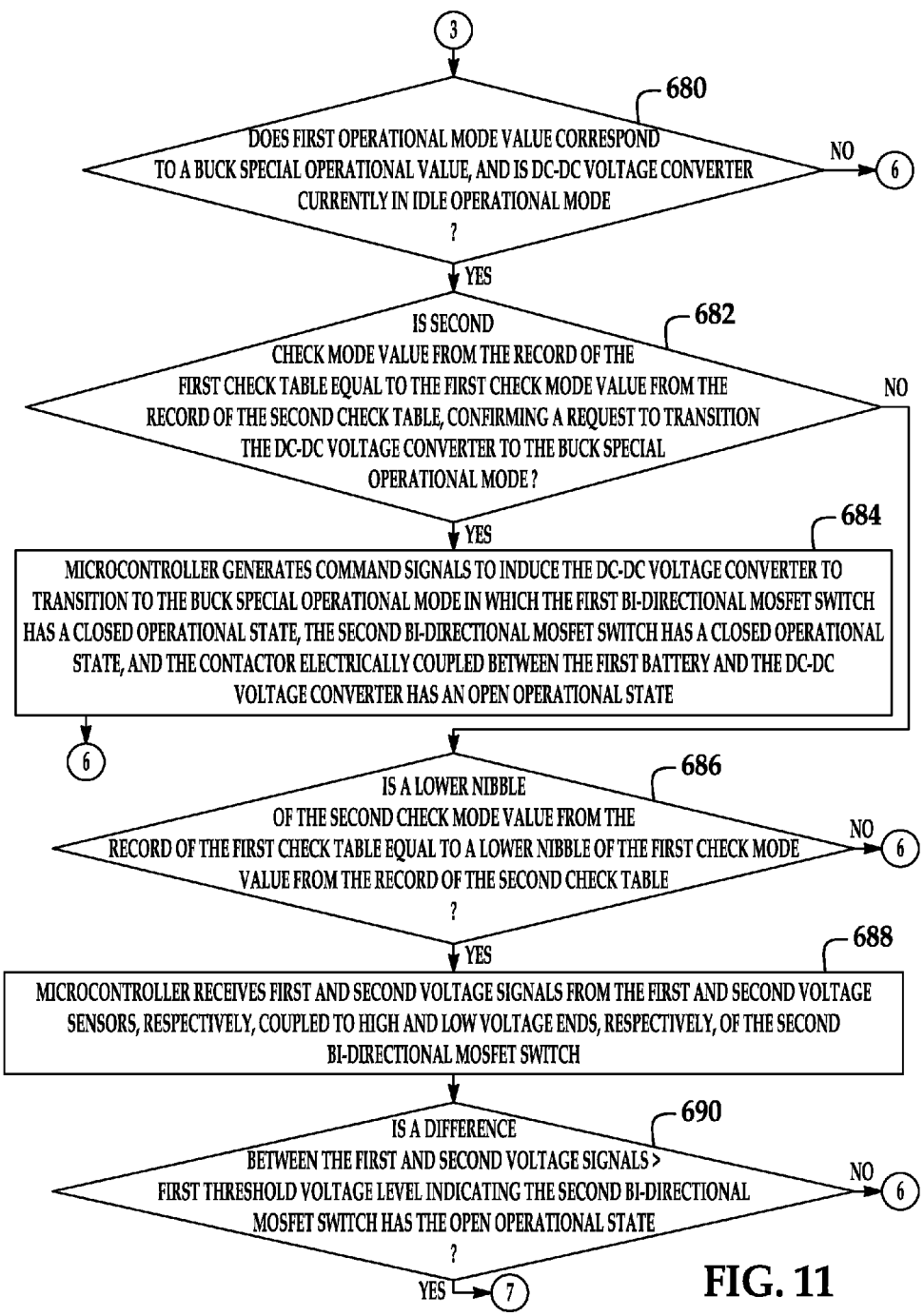
Figure 12:
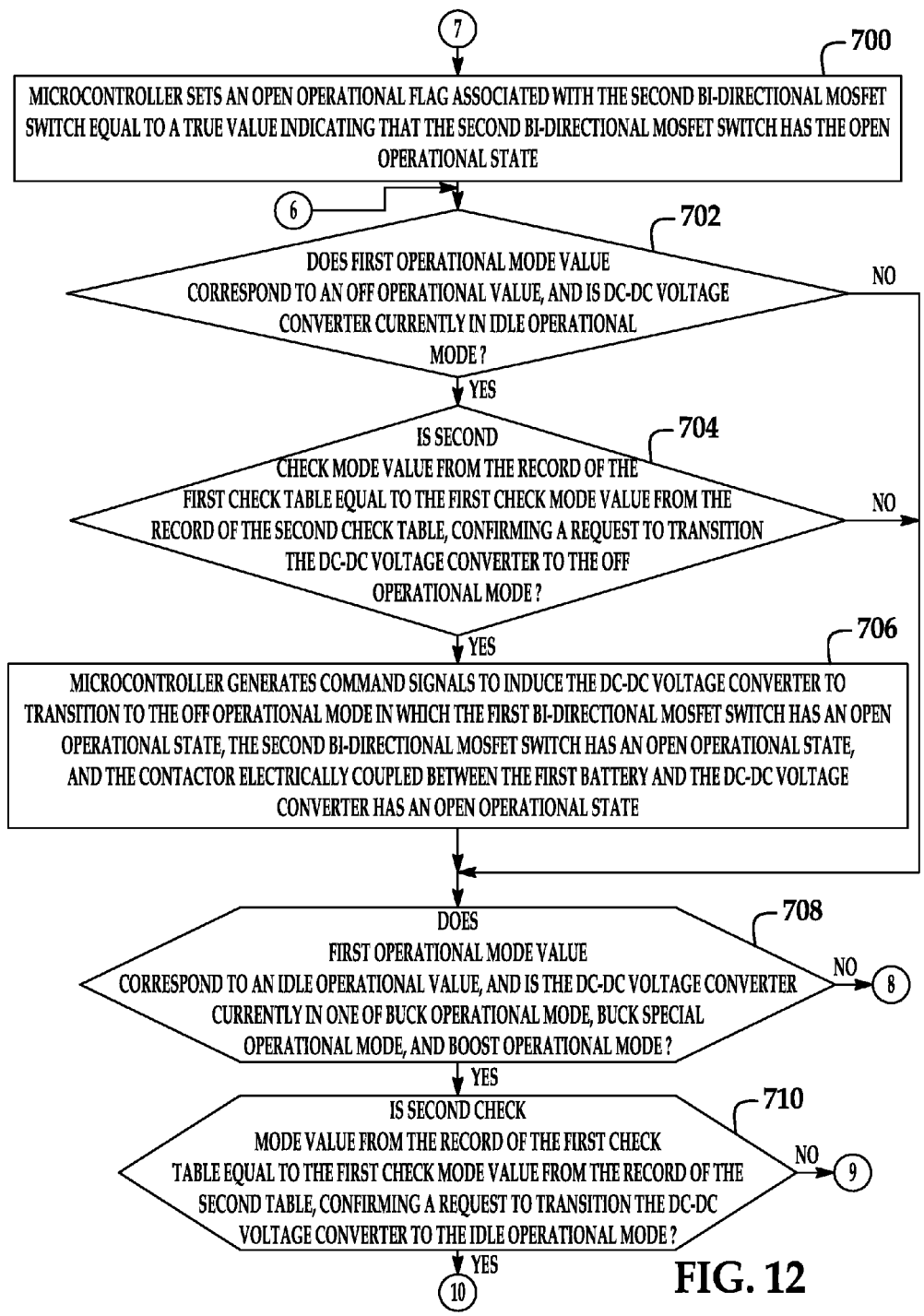
Figure 13:
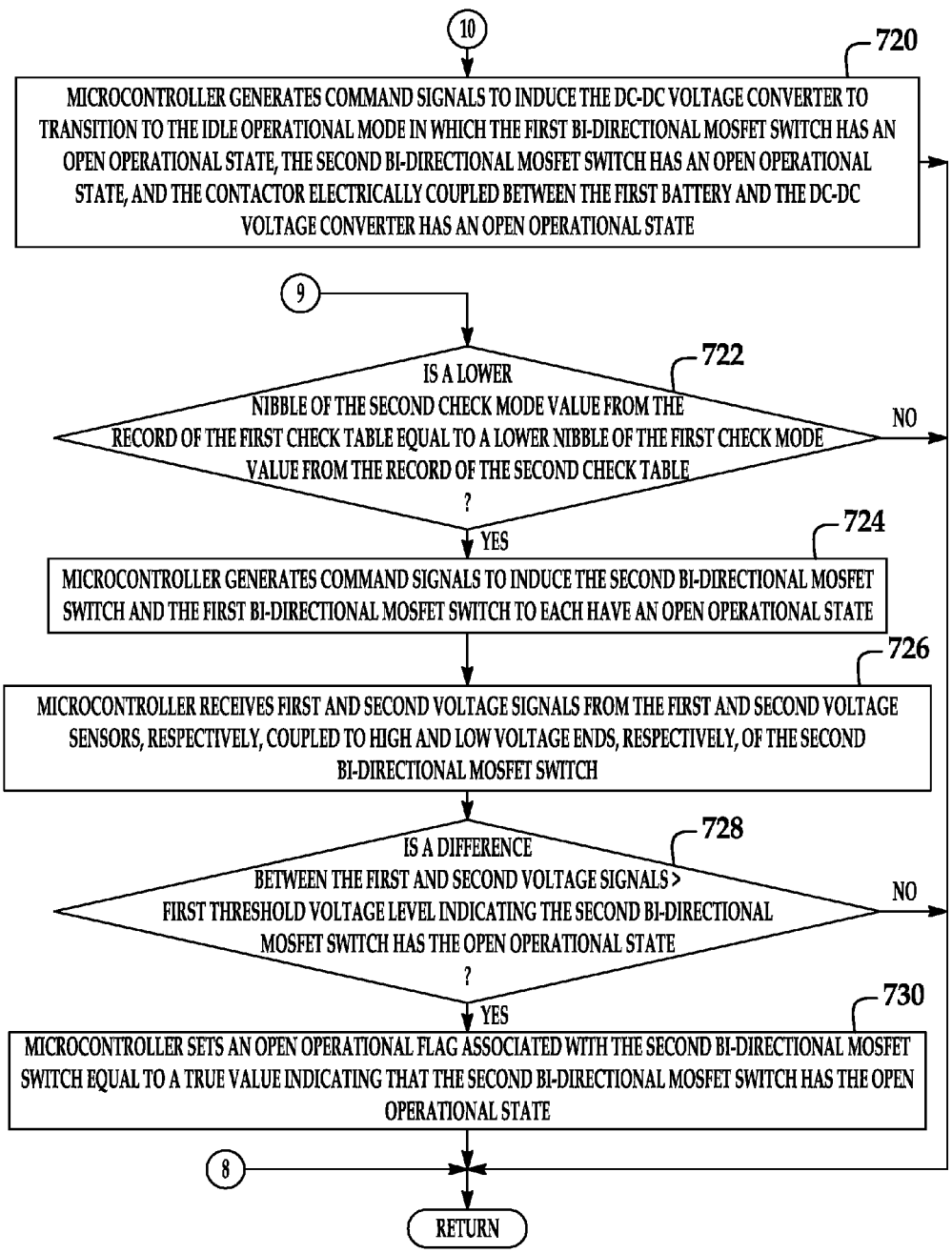
Figure 14:
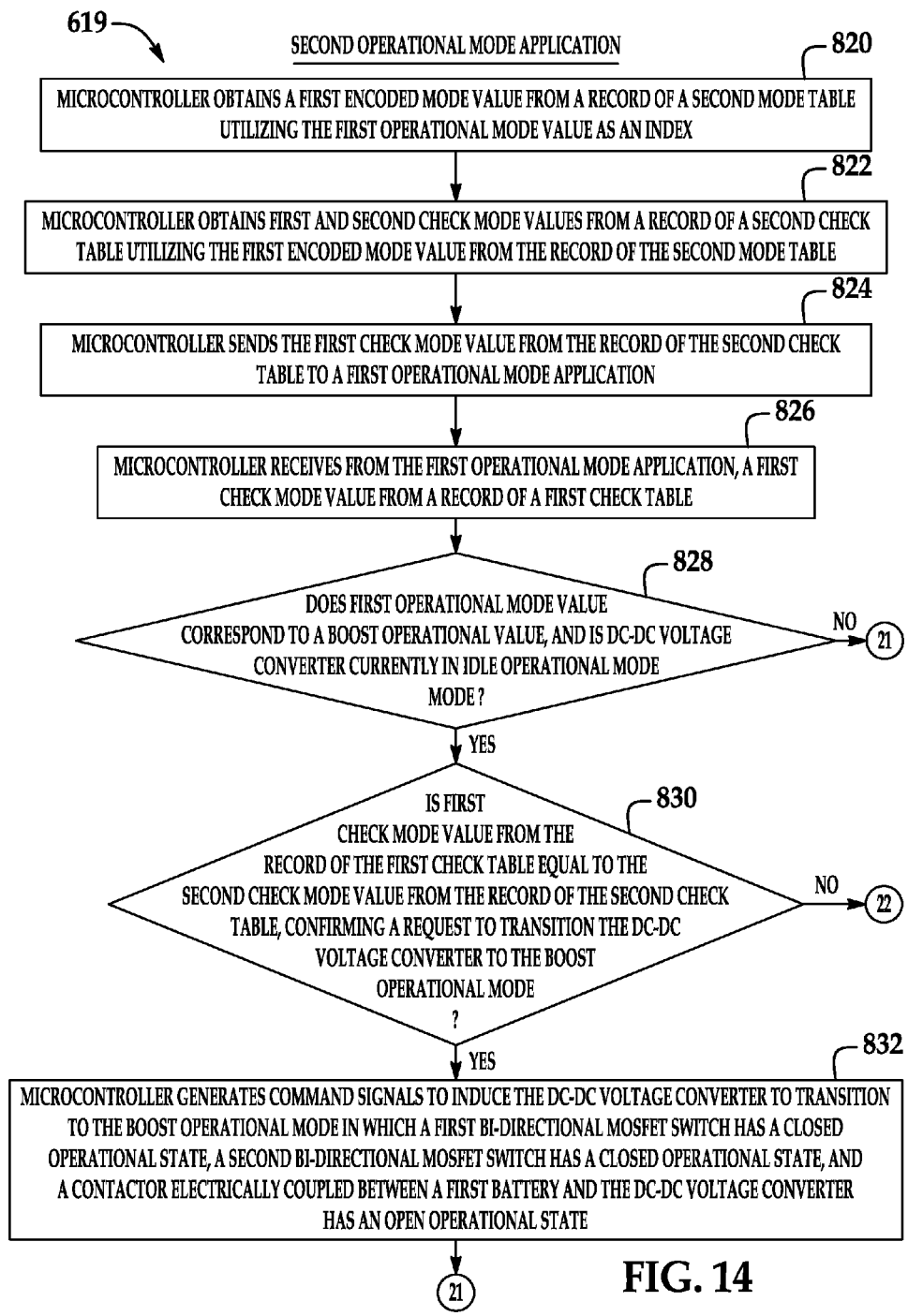
FIGS. 14-19 is a flowchart of a second operational mode application utilized by the main application of FIG. 7.
Figure 15:
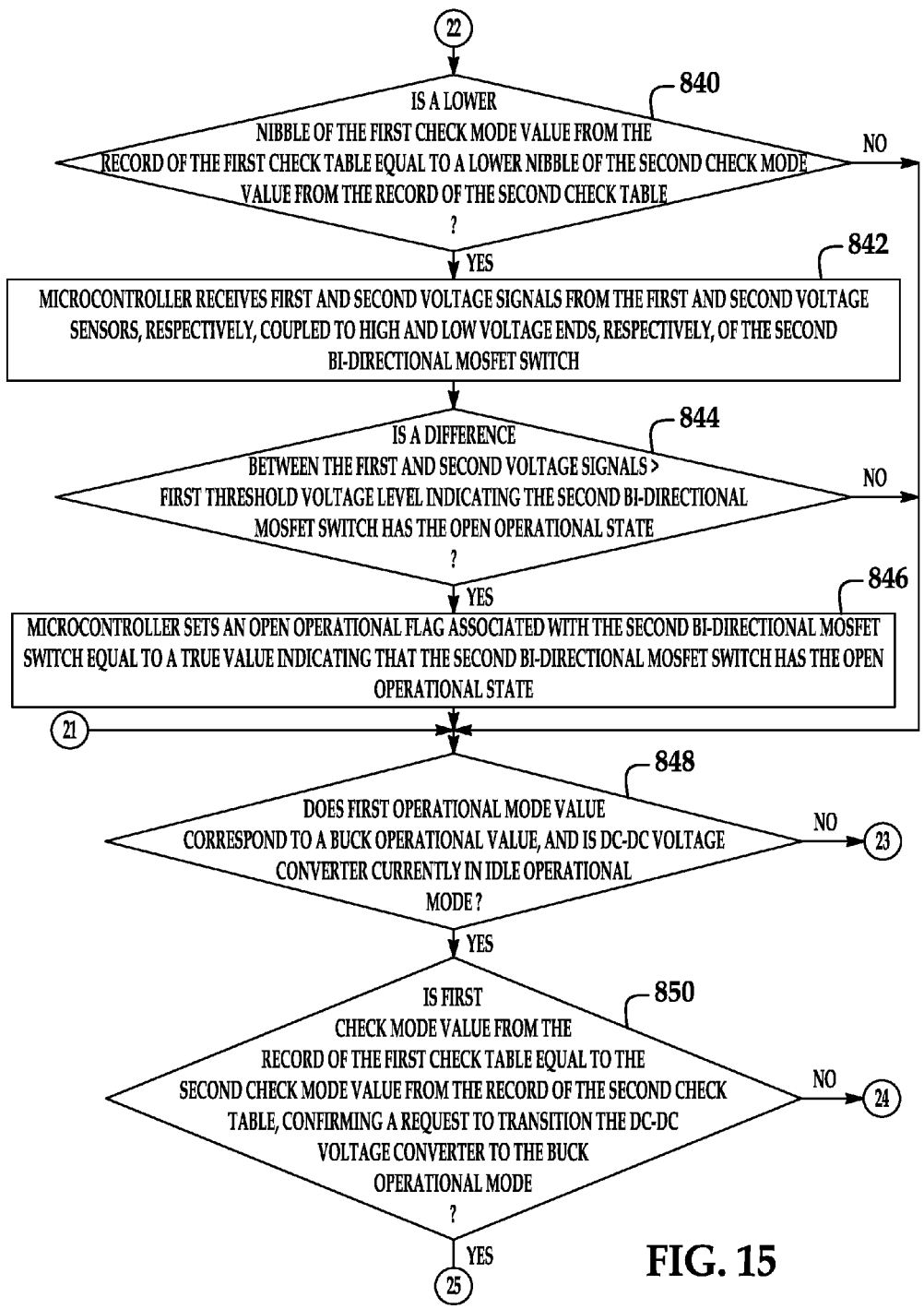
Figure 16:
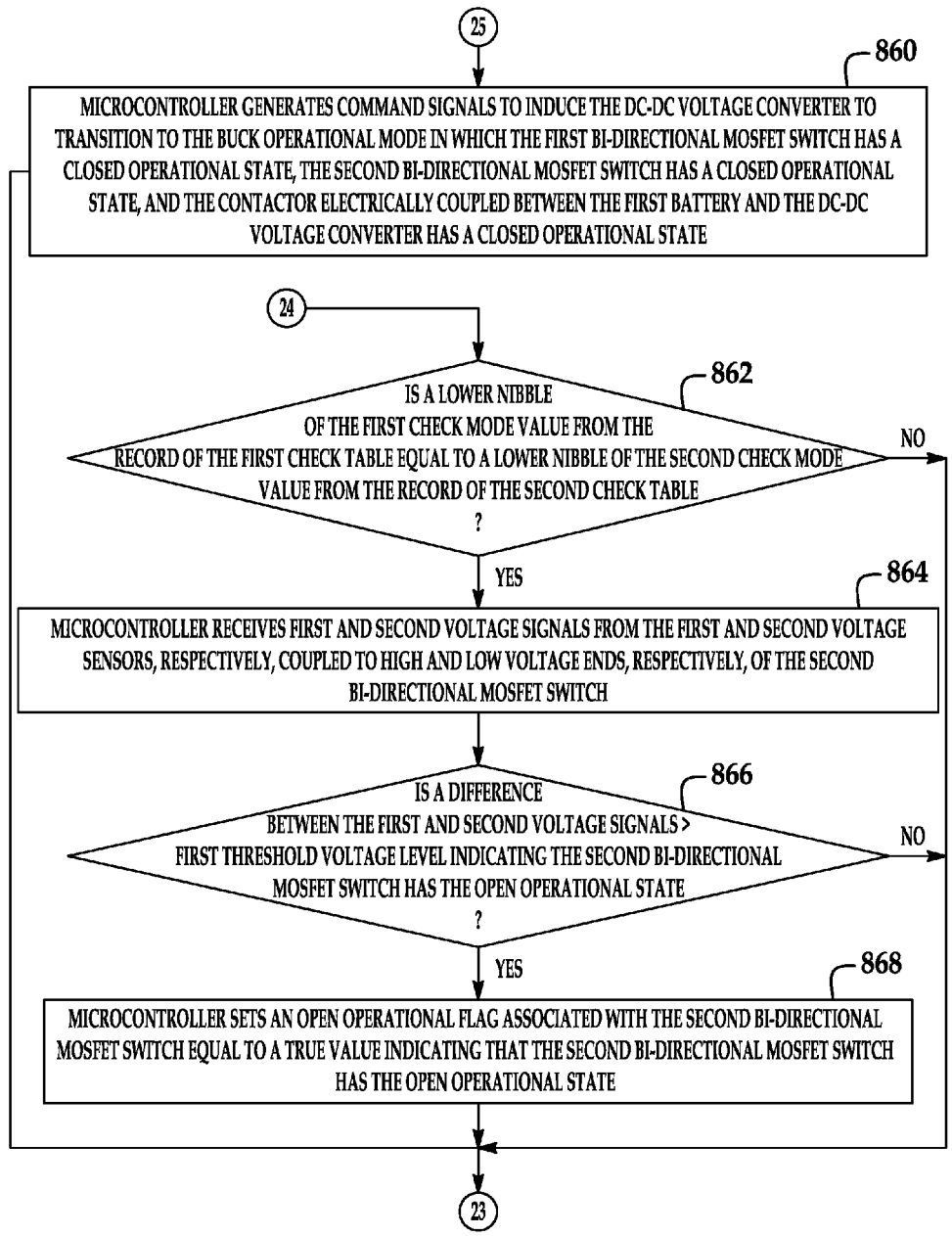
Figure 17:
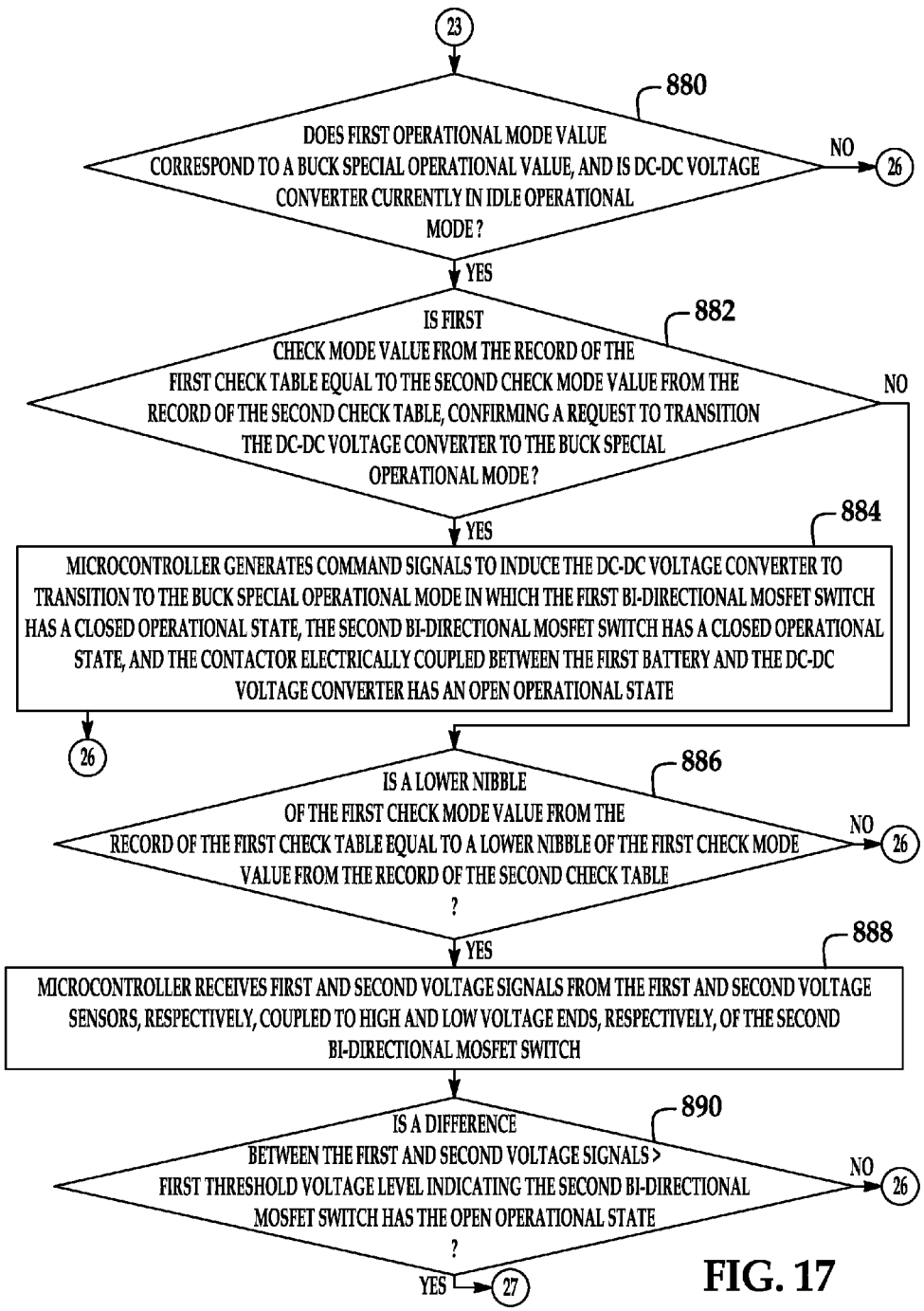
Figure 18:
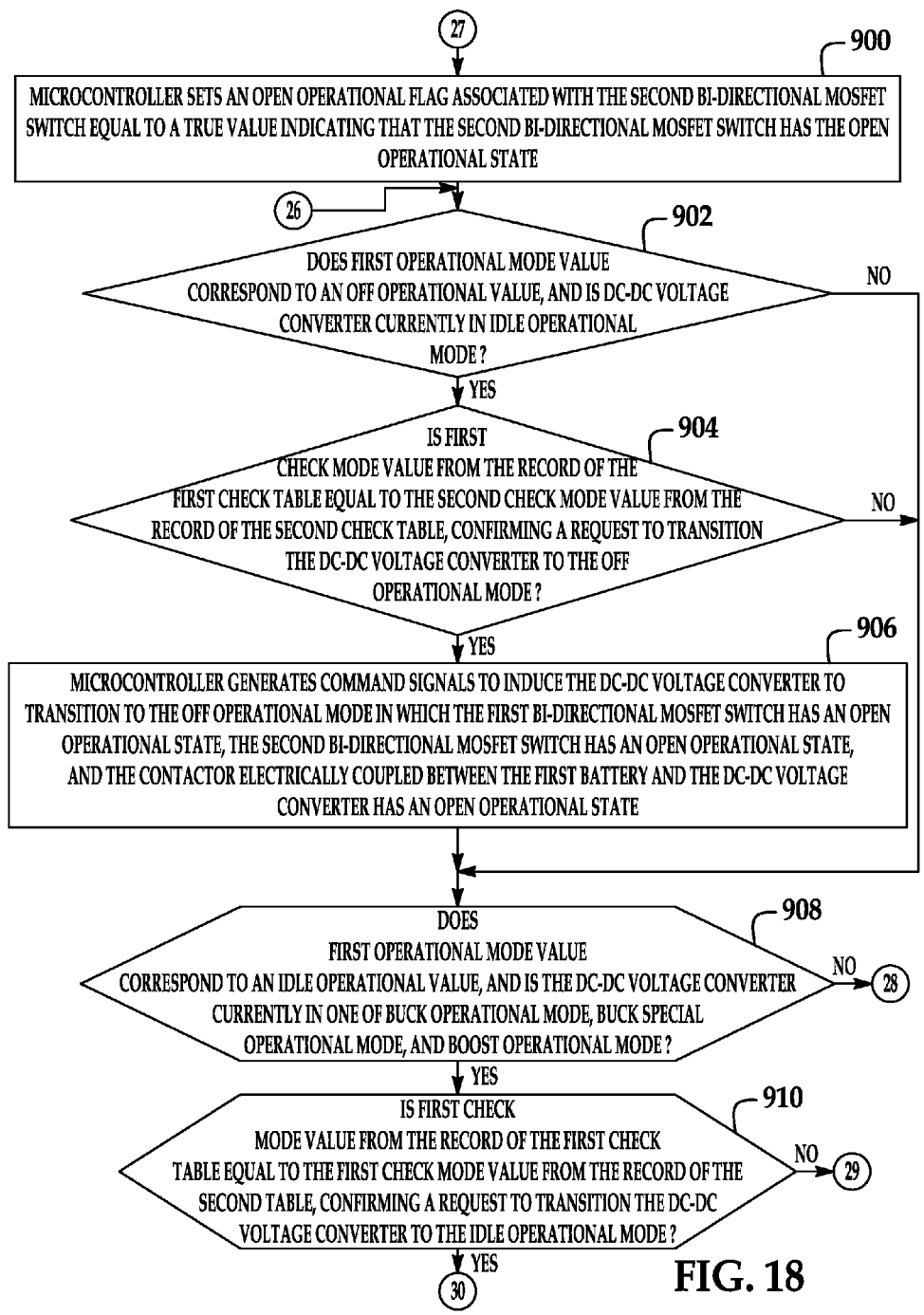
Figure 19:
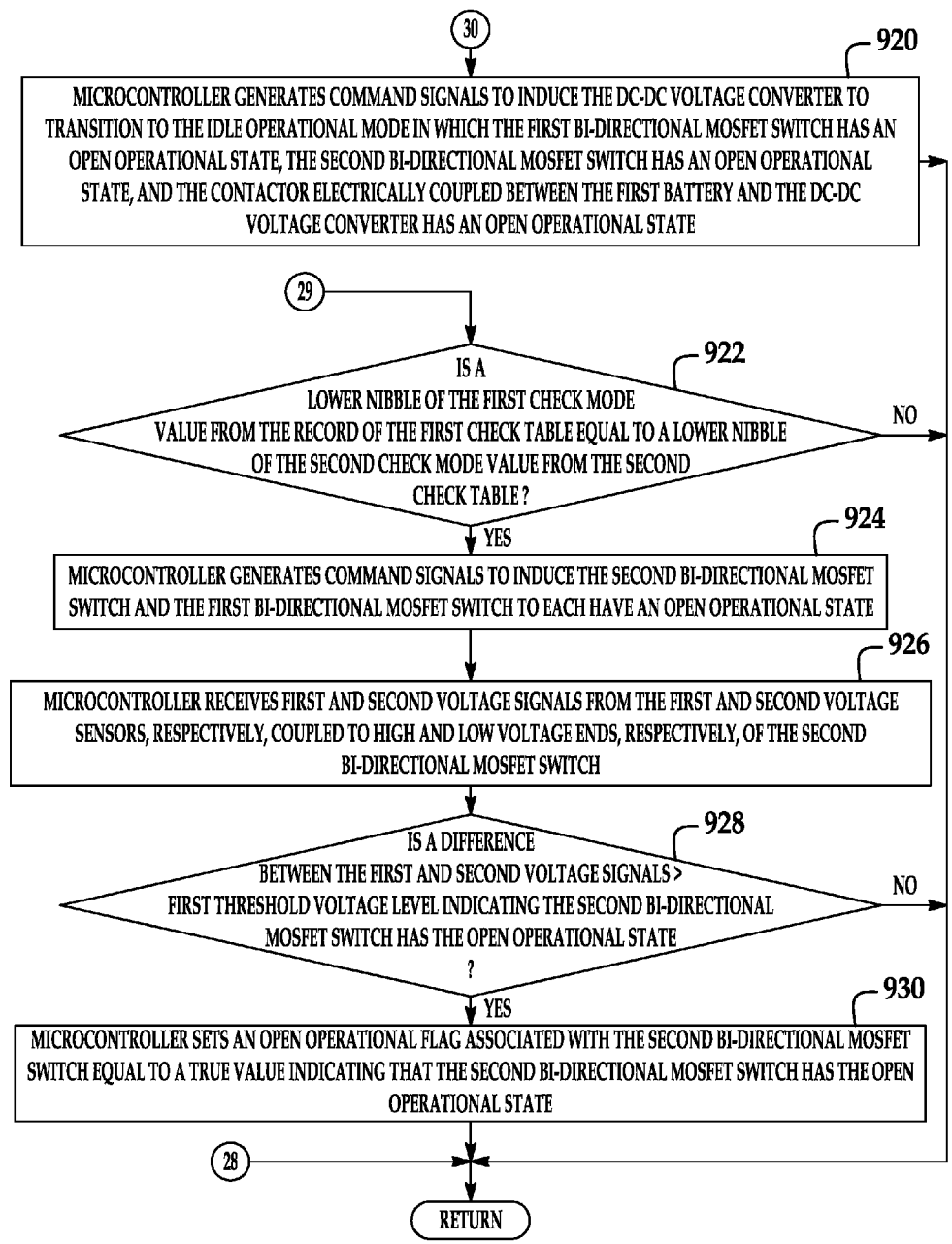

The record 251 is associated with the idle operational mode. The record 251 includes a decimal value "0" and an encoded mode value "FB" which is a hexadecimal value. When the microcontroller 190 receives an operational mode message having the decimal value "0" therein from the vehicle controller 60, a main application 590 (shown in FIG. 7) sends the decimal value "0" to first and second operational mode applications 618, 619 (shown in FIGS. 8-19). The first operational mode application 618 utilizes the value "0" as an index to obtain the encoded mode value "FB" from the record 251 in the first mode table 250.

The record 252 is associated with the buck operational mode. The record 252 includes a decimal value "1" and an encoded mode value "1D" which is a hexadecimal value. When the microcontroller 190 receives an operational mode message having the decimal value "1" therein from the vehicle controller 60, the main application 590 (shown in FIG. 7) sends the decimal value "1" to first and second operational mode applications 618, 619 (shown in FIGS. 8-19). The first operational mode application 618 utilizes the value "1" as an index to obtain the encoded mode value "1D" from the record 252 in the first mode table 250.

The record 253 is associated with the buck special operational mode. The record 253 includes a decimal value "4" and an encoded mode value "7D" which is a hexadecimal value. When the microcontroller 190 receives an operational mode message having the decimal value "4" therein from the vehicle controller 60, the main application 590 (shown in FIG. 7) sends the decimal value "4" to first and second operational mode applications 618, 619 (shown in FIGS. 8-19). The first operational mode application 618 utilizes the value "4" as an index to obtain the encoded mode value "7D" from the record 253 in the first mode table 250.

The record 254 is associated with the boost operational mode. The record 254 includes a decimal value "5" and an encoded mode value "BC" which is a hexadecimal value. When the microcontroller 190 receives an operational mode message having the decimal value "5" therein from the vehicle controller 60, the main application 590 (shown in FIG. 7) sends the decimal value "5" to first and second operational mode applications 618, 619 (shown in FIGS. 8-19). The first operational mode application 618 utilizes the value "5" as an index to obtain the encoded mode value "BC" from the record 254 in the first mode table 250.

The record 255 is associated with the off operational mode. The record 255 includes a decimal value "8" and an encoded mode value "A5" which is a hexadecimal value. When the microcontroller 190 receives an operational mode message having the decimal value "8" therein from the vehicle controller 60, the main application 590 (shown in FIG. 7) sends the decimal value "8" to first and second operational mode applications 618, 619 (shown in FIGS. 8-19). The first operational mode application 618 utilizes the value "8" as an index to obtain the encoded mode value "A5" from the record 255 in the first mode table 250.

Referring to records 251, 252, 253, 254, 255, the hexadecimal values "FB", "1D", "7D", "BC", "A5", respectively, have a Hamming distance of at least two from one another.

Referring to FIGS. 1 and 4, the second mode table 350 is utilized by a second operational mode application 619 to convert a received decimal mode value in an operational mode message from a vehicle controller 60 to an encoded mode value. The second mode table 350 includes the records 351, 352, 353, 354, 355.

The record 351 is associated with the idle operational mode. The record 351 includes a decimal value "0" and an encoded mode value "01" which is a hexadecimal value. When the microcontroller 190 receives an operational mode message having the decimal value "0" therein from the vehicle controller 60, a main application 590 (shown in FIG. 7) sends the decimal value "0" to the first and second operational mode applications 618, 619 (shown in FIGS. 8-19). The second operational mode application 619 utilizes the value "0" as an index to obtain the encoded mode value "01" from the record 351 in the second mode table 250.

The record 352 is associated with the buck operational mode. The record 352 includes a decimal value "1" and an encoded mode value "B8" which is a hexadecimal value. When the microcontroller 190 receives an operational mode message having the decimal value "1" therein from the vehicle controller 60, the main application 590 (shown in FIG. 7) sends the decimal value "1" to first and second operational mode applications 618, 619 (shown in FIGS. 8-19). The second operational mode application 619 utilizes the value "1" as an index to obtain the encoded mode value "B8" from the record 352 in the second mode table 350.

The record 353 is associated with the buck special operational mode. The record 253 includes a decimal value "4" and an encoded mode value "D8" which is a hexadecimal value. When the microcontroller 190 receives an operational mode message having the decimal value "4" therein from the vehicle controller 60, the main application 590 (shown in FIG. 7) sends the decimal value "4" to first and second operational mode applications 618, 619 (shown in FIGS. 8-19). The second operational mode application 619 utilizes the value "4" as an index to obtain the encoded mode value "D8" from the record 353 in the second mode table 350.

The record 354 is associated with the boost operational mode. The record 354 includes a decimal value "5" and an encoded mode value "14" which is a hexadecimal value. When the microcontroller 190 receives an operational mode message having the decimal value "5" therein from the vehicle controller 60, the main application 590 (shown in FIG. 7) sends the decimal value "5" to first and second operational mode applications 618, 619 (shown in FIGS. 8-19). The second operational mode application 619 utilizes the value "5" as an index to obtain the encoded mode value "14" from the record 354 in the second mode table 350.

The record 355 is associated with the off operational mode. The record 355 includes a decimal value "8" and an encoded mode value "5A" which is a hexadecimal value. When the microcontroller 190 receives an operational mode message having the decimal value "8" therein from the vehicle controller 60, the main application 590 (shown in FIG. 7) sends the decimal value "8" to first and second operational mode applications 618, 619 (shown in FIGS. 8-19). The second operational mode application 619 utilizes the value "8" as an index to obtain the encoded mode value "5A" from the record 355 in the second mode table 350.

Referring to records 351, 352, 353, 354, 355, the hexadecimal values "01", "B8", "D8", "14", "5A", respectively, have a Hamming distance of at least two from one another.

Referring to FIGS. 1-3, the first check mode table 280 is utilized by a first operational mode application 618 to confirm that the microcontroller 190 should transition to an operational mode identified by a received decimal mode value in an operational mode message from a vehicle controller 60. The first check mode table 280 includes the records 281, 282, 283, 284, 285.

The record 281 is associated with the idle operational mode. The record 281 includes the encoded mode values "FB" and "01" which are hexadecimal values. When the first operational mode application 618 obtains the encoded mode value "FB" from the first mode table 250, the application 618 obtains the encoded mode values "FB" and "01" from the record 281 utilizing the encoded mode value "FB" as an index. Further, the first operational mode application 618 sends the encoded mode value "FB" to the second operational mode application 619. Further, if the first operational mode application 618 receives an encoded mode value "01" from the second operational mode application 619 that is equal to the encoded mode value "01" in the record 281—which confirms that the microcontroller 190 should transition the DC-DC voltage converter 54 to the idle operational mode—the first operational mode application 618 transitions the DC-DC voltage converter 54 to the idle operational mode.

The record 282 is associated with the buck operational mode. The record 282 includes the encoded mode values "1D" and "B8" which are hexadecimal values. When the first operational mode application 618 obtains the encoded mode value "1D" from the first mode table 250, the application 618 obtains the encoded mode values "1D" and "B8" from the record 282 utilizing the encoded mode value "1D" as an index. Further, the first operational mode application 618 sends the encoded mode value "1D" to the second operational mode application 619. Further, if the first operational mode application 618 receives an encoded mode value "B8" from the second operational mode application 619 that is equal to the encoded mode value "B8" in the record 282—which confirms that the microcontroller 190 should transition the DC-DC voltage converter 54 to the buck operational mode—the first operational mode application 618 transitions the DC-DC voltage converter 54 to the buck operational mode.

The record 283 is associated with the buck special operational mode. The record 283 includes the encoded mode values "7D" and "D8" which are hexadecimal values. When the first operational mode application 618 obtains the encoded mode value "7D" from the first mode table 250, the application 618 obtains the encoded mode values "7D" and "D8" from the record 283 utilizing the encoded mode value "7D" as an index. Further, the first operational mode application 618 sends the encoded mode value "7D" to the second operational mode application 619. Further, if the first operational mode application 618 receives an encoded mode value "D8" from the second operational mode application 619 that is equal to the encoded mode value "D8" in the record 283—which confirms that the microcontroller 190 should transition the DC-DC voltage converter 54 to the buck special operational mode—the first operational mode application 618 transitions the DC-DC voltage converter 54 to the buck special operational mode.

The record 284 is associated with the boost operational mode. The record 284 includes the encoded mode values "BC" and "14" which are hexadecimal values. When the first operational mode application 618 obtains the encoded mode value "BC" from the first mode table 250, the application 618 obtains the encoded mode values "BC" and "14" from the record 284 utilizing the encoded mode value "BC" as an index. Further, the first operational mode application 618 sends the encoded mode value "BC" to the second operational mode application 619. Further, if the first operational mode application 618 receives an encoded mode value "14" from the second operational mode application 619 that is equal to the encoded mode value "14" in the record 284—which confirms that the microcontroller 190 should transition the DC-DC voltage converter 54 to the boost operational mode—the first operational mode application 618 transitions the DC-DC voltage converter 54 to the boost operational mode.

The record 285 is associated with the off operational mode. The record 285 includes the encoded mode values "A5" and "5A" which are hexadecimal values. When the first operational mode application 618 obtains the encoded mode value "A5" from the first mode table 250, the application 618 obtains the encoded mode values "A5" and "5A" from the record 285 utilizing the encoded mode value "A5" as an index. Further, the first operational mode application 618 sends the encoded mode value "A5" to the second operational mode application 619. Further, if the first operational mode application 618 receives an encoded mode value "5A" from the second operational mode application 619 that is equal to the encoded mode value "5A" in the record 285—which confirms that the microcontroller 190 should transition the DC-DC voltage converter 54 to the off operational mode—the first operational mode application 618 transitions the DC-DC voltage converter 54 to the off operational mode.

Referring to FIGS. 1, 4 and 5, the second check mode table 480 is utilized by the second operational mode application 619 to confirm that the microcontroller 190 should transition to an operational mode identified by a received decimal mode value in an operational mode message from the vehicle controller 60. The second check mode table 480 includes the records 481, 482, 483, 484, 485.

The record 481 is associated with the idle operational mode. The record 481 includes the encoded mode values "01" and "FB" which are hexadecimal values. When the second operational mode application 619 obtains the encoded mode value "01" from the second mode table 350, the application 619 obtains the encoded mode values "01" and "FB" from the record 481 utilizing the encoded mode value "01" as an index. Further, the second operational mode application 619 sends the encoded mode value "01" to the first operational mode application 618. Further, if the second operational mode application 619 receives an encoded mode value "FB" from the first operational mode application 618 that is equal to the encoded mode value "FB" in the record 481—which confirms that the microcontroller 190 should transition the DC-DC voltage converter 54 to the idle operational mode—the second operational mode application 619 transitions the DC-DC voltage converter 54 to the idle operational mode.

The record 482 is associated with the buck operational mode. The record 482 includes the encoded mode values "B8" and "1D" which are hexadecimal values. When the second operational mode application 619 obtains the encoded mode value "B8" from the second mode table 350, the application 619 obtains the encoded mode values "B8" and "1D" from the record 482 utilizing the encoded mode value "B8" as an index. Further, the second operational mode application 619 sends the encoded mode value "B8" to the first operational mode application 618. Further, if the second operational mode application 619 receives an encoded mode value "1D" from the first operational mode application 618 that is equal to the encoded mode value "1D" in the record 482—which confirms that the microcontroller 190 should transition the DC-DC voltage converter 54 to the buck operational mode—the second operational mode application 619 transitions the DC-DC voltage converter 54 to the buck operational mode.

The record 483 is associated with the buck special operational mode. The record 483 includes the encoded mode values "D8" and "7D" which are hexadecimal values. When the second operational mode application 619 obtains the encoded mode value "D8" from the second mode table 350, the application 619 obtains the encoded mode values "D8" and "7D" from the record 483 utilizing the encoded mode value "D8" as an index. Further, the second operational mode application 619 sends the encoded mode value "D8" to the first operational mode application 618. Further, if the second operational mode application 619 receives an encoded mode value "7D" from the first operational mode application 618 that is equal to the encoded mode value "7D" in the record 483—which confirms that the microcontroller 190 should transition the DC-DC voltage converter 54 to the buck special operational mode—the second operational mode application 619 transitions the DC-DC voltage converter 54 to the buck special operational mode.

The record 484 is associated with the boost operational mode. The record 484 includes the encoded mode values "14" and "BC" which are hexadecimal values. When the second operational mode application 619 obtains the encoded mode value "14" from the second mode table 350, the application 619 obtains the encoded mode values "14" and "BC" from the record 484 utilizing the encoded mode value "14" as an index. Further, the second operational mode application 619 sends the encoded mode value "14" to the first operational mode application 618. Further, if the second operational mode application 619 receives an encoded mode value "BC" from the first operational mode application 618 that is equal to the encoded mode value "BC" in the record 484—which confirms that the microcontroller 190 should transition the DC-DC voltage converter 54 to the boost operational mode—the second operational mode application 619 transitions the DC-DC voltage converter 54 to the boost operational mode.

The record 485 is associated with the off operational mode. The record 485 includes the encoded mode values "5A" and "A5" which are hexadecimal values. When the second operational mode application 619 obtains the encoded mode value "5A" from the second mode table 350, the application 619 obtains the encoded mode values "5A" and "A5" from the record 485 utilizing the encoded mode value "5A" as an index. Further, the second operational mode application 619 sends the encoded mode value "5A" to the first operational mode application 618. Further, if the second operational mode application 619 receives an encoded mode value "A5" from the first operational mode application 618 that is equal to the encoded mode value "A5" in the record 485—which confirms that the microcontroller 190 should transition the DC-DC voltage converter 54 to the off operational mode—the second operational mode application 619 transitions the DC-DC voltage converter 54 to the off operational mode.

Referring to FIGS. 1 and 7-19, a flowchart of a method for controlling operational modes of the DC-DC voltage converter 54 will now be explained. The method is implemented using the main application 590, the first operational mode application 618 (shown in FIGS. 8-13), and the second operational mode application 619 (shown in FIGS. 14-19).

Referring to FIG. 1, a flowchart of the main application 590 will now be explained.

At step 600, the microcontroller 190 initially has an idle operational mode. After step 600, the method advances to step 602.

At step 602, the microcontroller 190 receives a first operational mode message from a communication bus 62. The first operational mode message has a first operational mode value indicating a first operational mode that the DC-DC voltage converter 54 is being commanded to transition into. After step 602, the method advances to step 604.

At step 604, the microcontroller 190 executes first and second operational mode applications 618, 619. After step 604, the method returns to step 602.

Referring to FIGS. 1 and 8-13, a flowchart of the first operational mode application 618 will now be explained.

At step 620, the microcontroller 190 obtains a first encoded mode value from a record of the first mode table 250 utilizing the first operational mode value as an index. After step 620, the method advances to step 622.

At step 622, the microcontroller 190 obtains first and second check mode values from a record of a first check table 280 utilizing the first encoded mode value from the record of the first mode table 250. After step 622, the method advances to step 624.

At step 624, the microcontroller 190 sends the first check mode value from the record of the first check table 280 to a second operational mode application 619. After step 624, the method advances to step 626.

At step 626, the microcontroller 190 receives from the second operational mode application 619, a first check mode value from a record of a second check table 480. After step 626, the method advances to step 628.

At step 628, the microcontroller 190 makes a determination as to whether the first operational mode value corresponds to a boost operational value, and whether the DC-DC voltage converter 54 is currently in the idle operational mode. If the value of step 628 equals "yes", the method advances to step 630. Otherwise, the method advances to step 648.

At step 630, the microcontroller 54 makes a determination as to whether the second check mode value from the record of the first check table 280 is equal to the first check mode value from the record of the second check table 480, confirming a request to transition the DC-DC voltage converter 54 to the boost operational mode. If the value of step 630 equals "yes", the method advances to step 632. Otherwise, the method advances to step 640.

At step 632, the microcontroller 190 generates command signals to induce the DC-DC voltage converter 54 to transition to the boost operational mode in which the first bi-directional MOSFET switch 110 has a closed operational state, the second bi-directional MOSFET switch 114 has a closed operational state, and the contactor 42 electrically coupled between the battery 40 and the DC-DC voltage converter 54 has an open operational state. After step 632, the method advances to step 648.

Referring again to step 630, if the value of step 630 equals "no", the method advances to step 640. At step 640, the microcontroller 190 makes a determination as to whether the lower nibble of the second check mode value from the record of the first check table 280 is equal to the lower nibble of the first check mode value from the record of the second check table 480. If the value of step 640 equals "yes", the method advances to step 642. Otherwise, the method advances to step 648.

At step 642, the microcontroller 190 receives first and second voltage signals from the voltage sensors 192, 194, respectively, coupled to high and low voltage ends, respectively, of the second bi-directional MOSFET switch 114. After step 642, the method advances to step 644.

At step 644, the microcontroller 190 makes a determination as to whether a difference between the first and second voltage signals is greater than a first threshold voltage level indicating the second bi-directional MOSFET switch 114 has the open operational state. If the value of step 644 equals "yes", the method advances to step 646. Otherwise, the method advances to step 648.

At step 646, the microcontroller 190 sets an open operational flag associated with the second bi-directional MOSFET switch 114 equal to a true value indicating that the second bi-directional MOSFET switch 114 has the open operational state. After step 646, the method advances to step 648.

At step 648, the microcontroller 190 makes a determination as to whether the first operational mode value corresponds to a buck operational value, and whether the DC-DC voltage converter 54 is currently in idle operational mode. If the value of step 648 equals "yes", the method advances to step 650. Otherwise, the method advances to step 680.

At step 650, the microcontroller 190 makes a determination as to whether the second check mode value from the record of the first check table 280 is equal to the first check mode value from the record of the second check table 480, confirming a request to transition the DC-DC voltage converter 54 to the buck operational mode. If the value of step 650 equals "yes", the method advances to step 660. Otherwise, the method advances to step 662.

At step 660, the microcontroller 190 generates command signals to induce the DC-DC voltage converter 54 to transition to the buck operational mode in which the first bi-directional MOSFET switch 110 has a closed operational state, the second bi-directional MOSFET switch 114 has a closed operational state, and the contactor 42 electrically coupled between the battery 40 and the DC-DC voltage converter 54 has a closed operational state. After step 660, the method advances to step 680.

Referring again to step 650, if the value of step 650 equals "no", the method advances to step 662. At step 662, the microcontroller 190 makes a determination as to whether a lower nibble of the second check mode value from the record of the first check table 280 is equal to a lower nibble of the first check mode value from the record of the second check table 480. If the value of step 662 equals "yes", the method advances to step 664. Otherwise, the method advances to step 680.

At step 664, the microcontroller 190 receives first and second voltage signals from voltage sensors 192, 194, respectively, coupled to high and low voltage ends, respectively, of the second bi-directional MOSFET switch 114. After step 664, the method advances to step 666.

At step 666, the microcontroller 190 makes a determination as to whether a difference between the first and second voltage signals is greater than a first threshold voltage level indicating the second bi-directional MOSFET switch 114 has the open operational state. If the value of step 666 equals "yes", the method advances to step 668. Otherwise, the method advances to step 680.

At step 668, the microcontroller 190 sets an open operational flag associated with the second bi-directional MOSFET switch 114 equal to a true value indicating that the second bi-directional MOSFET switch 114 has the open operational state. After step 668, the method advances to step 680.

At step 680, the microcontroller 190 makes a determination as to whether the first operational mode value corresponds to a buck special operational value, and whether the DC-DC voltage converter 54 is currently in the idle operational mode. If the value of step 680 equals "yes", the method advances to step 682. Otherwise, the method advances to step 702.

At step 682, the microcontroller 190 makes a determination as to whether the second check mode value from the record of the first check table 280 is equal to the first check mode value from the record of the second check table 480, confirming a request to transition the DC-DC voltage converter 54 to the buck special operational mode. If the value of step 682, equals "yes", the method advances to step 684. Otherwise, the method advances to step 686.

At step 684, the microcontroller 190 generates command signals to induce the DC-DC voltage converter 54 to transition to the buck special operational mode in which the first bi-directional MOSFET switch 110 has a closed operational state, the second bi-directional MOSFET switch 114 has a closed operational state, and the contactor 42 electrically coupled between the battery 40 and the DC-DC voltage converter 54 has an open operational state. After step 684, the method advances to step 702.

Referring again to step 682, if the value of step 682 equals "no", the method advances to step 686. At step 686, the microcontroller 190 makes a determination as to whether a lower nibble of the second check mode value from the record of the first check table 280 is equal to a lower nibble of the first check mode value from the record of the second check table 480. If the value of step 686 equals "yes", the method advances to step 688. Otherwise, the method advances to step 702.

At step 688, the microcontroller 190 receives first and second voltage signals from voltage sensors 192, 194, respectively, coupled to high and low voltage ends, respectively, of the second bi-directional MOSFET switch 114. After step 688, the method advances to step 690.

At step 690, the microcontroller 190 makes a determination as to whether a difference between the first and second voltage signals is greater than a first threshold voltage level indicating the second bi-directional MOSFET switch 114 has the open operational state. If the value of step 690 equals "yes", the method advances to step 700. Otherwise, the method advances to step 702.

At step 700, the microcontroller 190 sets an open operational flag associated with the second bi-directional MOSFET switch 114 equal to a true value indicating that the second bi-directional MOSFET switch 114 has the open operational state. After step 700, the method advances to step 702.

At step 702, the microcontroller 190 makes a determination as to whether the first operational mode value corresponds to an off operational value, and whether DC-DC voltage converter 54 is currently in the idle operational mode. If the value of step 702 equals "yes", the method advances to step 704. Otherwise, the method advances to step 708.

At step 704, the microcontroller 190 makes a determination as to whether the second check mode value from the record of the first check table 280 is equal to the first check mode value from the record of the second check table 480, confirming a request to transition the DC-DC voltage converter 54 to the off operational mode. If the value of step 704 equals "yes", the method advances to step 706. Otherwise, the method advances to step 708.

At step 706, the microcontroller 190 generates command signals to induce the DC-DC voltage converter 54 to transition to the off operational mode in which the first bi-directional MOSFET switch 110 has an open operational state, and the second bi-directional MOSFET switch 114 has an open operational state, and the contactor 42 electrically coupled between the first battery and the DC-DC voltage converter 54 has an open operational state. After step 706, the method advances to step 708.

At step 708, the microcontroller 190 makes a determination as to whether the first operational mode value corresponds to an idle operational value, and whether the DC-DC voltage converter 54 is currently in one of buck operational mode, buck special operational mode, and boost operational mode. If the value of step 708 equals "yes", the method advances to step 710. Otherwise, the method returns to the main application 590.

At step 710, the microcontroller 190 makes a determination as to whether the second check mode value from the record of the first check table 280 is equal to the first check mode value from the record of the second check table 480, confirming a request to transition the DC-DC voltage converter 54 to the idle operational mode. If the value of step 710 equals "yes", the method advances to step 720. Otherwise, the method advances to step 722.

At step 720, the microcontroller 190 generates command signals to induce the DC-DC voltage converter 54 to transition to the idle operational mode in which the first bi-directional MOSFET switch 110 has an open operational state, and the second bi-directional MOSFET switch 114 has an open operational state, and the contactor 42 electrically coupled between the first battery and the DC-DC voltage converter 54 has an open operational state. After step 720, the method returns to the main application 590.

Referring again to step 710, if the value of step 710 equals "no", the method advances to step 722. At step 722, the microcontroller 190 makes a determination as to whether a lower nibble of the second check mode value from the record of the first check table 280 is equal to a lower nibble of the first check mode value from the record of the second check table 480. If the value of step 722 equals "yes", the method advances to step 724. Otherwise, the method returns to the main application 590.

At step 724, the microcontroller 190 generates command signals to induce the second bi-directional MOSFET switch 114 and the first bi-directional MOSFET switch 110 to each have an open operational state. After step 724, the method advances to step 726.

At step 726, the microcontroller 190 receives first and second voltage signals from the voltage sensors 192, 194, respectively, coupled to high and low voltage ends, respectively, of the second bi-directional MOSFET switch 114. After step 726, the method advances to step 728.

At step 728, the microcontroller 190 makes a determination as to whether a difference between the first and second voltage signals is greater than a first threshold voltage level indicating the second bi-directional MOSFET switch 114 has the open operational state. If the value of step 728 equals "yes", the method advances to step 730. Otherwise, the method returns to the main application 590.

At step 730, the microcontroller 190 sets an open operational flag associated with the second bi-directional MOSFET switch 114 equal to a true value indicating that the second bi-directional MOSFET switch 114 has the open operational state. After step 730, the method returns to the main application 590.

Referring to FIGS. 1 and 14-19, a flowchart of the second operational mode application 619 will now be explained.

At step 820, the microcontroller 190 obtains a first encoded mode value from a record of a second mode table 350 utilizing the first operational mode value as an index. After step 820, the method advances to step 822.

At step 822, the microcontroller 190 obtains first and second check mode values from a record of a second check table 480 utilizing the first encoded mode value from the record of the second mode table 350. After step 822, the method advances to step 824.

At step 824, the microcontroller 190 sends the first check mode value from the record of the second check table 480 to the first operational mode application 618. After step 824, the method advances to step 826.

At step 826, the microcontroller 190 receives from the first operational mode application 618, a first check mode value from a record of a first check table 280. After step 826, the method advances to step 828.

At step 828, the microcontroller 190 makes a determination as to whether the first operational mode value corresponds to a boost operational value, and whether the DC-DC voltage converter 54 is currently in idle operational mode. If the value of step 828 equals "yes", the method advances to step 830. Otherwise, the method advances to step 848.

At step 830, the microcontroller 190 makes a determination as to whether a first check mode value from the record of the first check table 280 is equal to the second check mode value from the record of the second check table 480, confirming a request to transition the DC-DC voltage converter 54 to the boost operational mode. If the value of step 830 equals "yes", the method advances to step 832. Otherwise, the method advances to step 840.

At step 832, the microcontroller 190 generates command signals to induce the DC-DC voltage converter 54 to transition to the boost operational mode in which the first bi-directional MOSFET switch 110 has a closed operational state, the second bi-directional MOSFET switch 114 has a closed operational state, and the contactor 42 electrically coupled between the battery 40 and the DC-DC voltage converter 54 has an open operational state. After step 832, the method advances to step 848.

Referring again to step 830, if the value of step 830 equals "no", the method advances to step 840. At step 840, the microcontroller 190 makes a determination as to whether a lower nibble of the first check mode value from the record of the first check table 280 is equal to a lower nibble of the second check mode value from the record of the second check table 480. If the value of step 840 equals "yes", the method advances to step 842. Otherwise, the method advances to step 848.

At step 842, the microcontroller 190 receives first and second voltage signals from voltage sensors 192, 194, respectively, coupled to high and low voltage ends, respectively, of the second bi-directional MOSFET switch 114. After step 842, the method advances to step 844.

At step 844, the microcontroller 190 makes a determination as to whether a difference between the first and second voltage signals is greater than a first threshold voltage level indicating the second bi-directional MOSFET switch 114 has the open operational state. If the value of step 844 equals "yes", the method advances to step 846. Otherwise, the method advances to step 848.

At step 846, the microcontroller 190 sets an open operational flag associated with the second bi-directional MOSFET switch 114 equal to a true value indicating that the second bi-directional MOSFET switch 114 has the open operational state. After step 846, the method advances to step 848.

At step 848, the microcontroller 190 makes a determination as to whether the first operational mode value corresponds to a buck operational value, and whether the DC-DC voltage converter 54 is currently in the idle operational mode. If the value of step 848 equals "yes", the method advances to step 850. Otherwise, the method advances to step 880, At step 850, the microcontroller 190 makes a determination as to whether a first check mode value from the record of the first check table 280 is equal to the second check mode value from the record of the second check table 480, confirming a request to transition the DC-DC voltage converter 54 to the buck operational mode. If the value of step 850 equals "yes", the method advances to step 860. Otherwise, the method advances to step 862.

At step 860, the microcontroller 190 generates command signals to induce the DC-DC voltage converter 54 to transition to the buck operational mode in which the first bi-directional MOSFET switch 110 has a closed operational state, the second bi-directional MOSFET switch 114 has a closed operational state, and the contactor 42 electrically coupled between the battery 40 and the DC-DC voltage converter 54 has a closed operational state. After step 860, the method advances to step 880.

Referring again to step 850, if the value of step 850 equals "no", the method advances to step 862. At step 862, the microcontroller 190 makes a determination as to whether a lower nibble of the first check mode value from the record of the first check table 280 is equal to a lower nibble of the second check mode value from the record of the second check table 480. If the value of step 862 equals "yes", the method advances to step 864. Otherwise, the method advances to step 880.

At step 864, the microcontroller 190 receives first and second voltage signals from voltage sensors 192, 194, respectively, coupled to high and low voltage ends, respectively, of the second bi-directional MOSFET switch 114. After step 864, the method advances to step 866.

At step 866, the microcontroller 190 makes a determination as to whether a difference between the first and second voltage signals is greater than a first threshold voltage level indicating the second bi-directional MOSFET switch 114 has the open operational state. If the value of step 866 equals "yes", the method advances to step 868. Otherwise, the method advances to step 880.

At step 868, the microcontroller 190 sets an open operational flag associated with the second bi-directional MOSFET switch 114 equal to a true value indicating that the second bi-directional MOSFET switch 114 has the open operational state. After step 868, the method advances to step 880.

At step 880, the microcontroller 190 makes a determination as to whether the first operational mode value corresponds to a buck special operational value, and whether the DC-DC voltage converter 54 is currently in the idle operational mode. If the value of step 880 equals "yes", the method advances to step 882. Otherwise, the method advances to step 902.

At step 882, the microcontroller 190 makes a determination as to whether a first check mode value from the record of the first check table 280 is equal to the second check mode value from the record of the second check table 480, confirming a request to transition the DC-DC voltage converter 54 to the buck special operational mode. If the value of step 882 equals "yes", the method advances to step 884. Otherwise, the method advances to step 886.

At step 884, the microcontroller 190 generates command signals to induce the DC-DC voltage converter 54 to transition to the buck special operational mode in which the first bi-directional MOSFET switch 110 has a closed operational state, the second bi-directional MOSFET switch 114 has a closed operational state, and the contactor 42 electrically coupled between the first battery and the DC-DC voltage converter 54 has an open operational state. After step 884, the method advances to step 902.

Referring again to step 882, if the value of step 882 equals "no", the method advances to step 886. At step 886, the microcontroller 190 makes a determination as to whether a lower nibble of the first check mode value from the record of the first check table 280 is equal to a lower nibble of the second check mode value from the record of the second check table 480. If the value of step 886 equals "yes", the method advances to step 888. Otherwise, the method advances to step 902.

At step 888, the microcontroller 190 receives first and second voltage signals from voltage sensors 192, 194, respectively, coupled to high and low voltage ends, respectively, of the second bi-directional MOSFET switch 114. After step 888, the method advances to step 890.

At step 890, the microcontroller 190 makes a determination as to whether a difference between the first and second voltage signals is greater than a first threshold voltage level indicating the second bi-directional MOSFET switch 114 has the open operational state. If the value of step 890 equals "yes", the method advances to step 900. Otherwise, the method advances to step 902.

At step 900, the microcontroller 190 sets an open operational flag associated with the second bi-directional MOSFET switch 114 equal to a true value indicating that the second bi-directional MOSFET switch 114 has the open operational state. After step 900, the method advances to step 902.

At step 902, the microcontroller 190 makes a determination as to whether the first operational mode value corresponds to an off operational value, and whether the DC-DC voltage converter 54 is currently in the idle operational mode. If the value of step 902 equals "yes", the method advances to step 904. Otherwise, the method advances to step 908.

At step 904, the microcontroller 190 makes a determination as to whether a first check mode value from the record of the first check table 280 is equal to the second check mode value from the record of the second check table 480, confirming a request to transition the DC-DC voltage converter 54 to the off operational mode. If the value of step 904 equals "yes", the method advances to step 906. Otherwise, the method advances to step 908.

At step 906, the microcontroller 190 generates command signals to induce the DC-DC voltage converter 54 to transition to the off operational mode in which the first bi-directional MOSFET switch 110 has an open operational state, and the second bi-directional MOSFET switch 114 has an open operational state, and the contactor 42 electrically coupled between the first battery and the DC-DC voltage converter 54 has an open operational state. After step 906, the method advances to step 908.

At step 908, the microcontroller 190 makes a determination as to whether the first operational mode value corresponds to an idle operational value, and whether the DC-DC voltage converter 54 is currently in one of buck operational mode, buck special operational mode, and boost operational mode. If the value of step 908 equals "yes", the method advances to step 910. Otherwise, the method returns to the main application 590.

At step 910, the microcontroller 190 makes a determination as to whether the first check mode value from the record of the first check table 280 is equal to the second check mode value from the record of the second check table 480, confirming a request to transition the DC-DC voltage converter 54 to the idle operational mode. If the value of step 910 equals "yes", the method advances to step 920. Otherwise, the method advances to step 922.

At step 920, the microcontroller 190 generates command signals to induce the DC-DC voltage converter 54 to transition to the idle operational mode in which the first bi-directional MOSFET switch 110 has an open operational state, and the second bi-directional MOSFET switch 114 has an open operational state, and the contactor 42 electrically coupled between the battery 40 and the DC-DC voltage converter 54 has an open operational state. After step 920, the method returns to the main application 590.

Referring again to step 910, if the value of step 910 equals "no", the method advances to step 922. At step 922, the microcontroller 190 makes a determination as to whether a lower nibble of the first check mode value from the record of the first check table 280 is equal to a lower nibble of the second check mode value from the record of the second check table 480. If the value of step 922 equals "yes", the method advances to step 924. Otherwise, the method returns to the main application 590.

At step 924, the microcontroller 190 generates command signals to induce the second bi-directional MOSFET switch 114 and the first bi-directional MOSFET switch 110 to each have an open operational state. After step 924, the method advances to step 926.

At step 926, the microcontroller 190 receives first and second voltage signals from voltage sensors 192, 194, respectively, coupled to high and low voltage ends, respectively, of the second bi-directional MOSFET switch 114. After step 926, the method advances to step 928.

At step 928, the microcontroller 190 makes a determination as to whether a difference between the first and second voltage signals is greater than a first threshold voltage level indicating the second bi-directional MOSFET switch 114 has the open operational state. If the value of step 928 equals "yes", the method advances to step 930. Otherwise, the method returns to the main application 590.

At step 930, the microcontroller 190 sets an open operational flag associated with the second bi-directional MOSFET switch 114 equal to a true value indicating that the second bi-directional MOSFET switch 114 has the open operational state. After step 930, the method returns to the main application 590.

The control system for controlling operational modes of the DC-DC voltage converter provides a substantial advantage over other control systems. In particular, the control system has a microcontroller that utilizes first and second operational mode applications that can each confirm that the DC-DC voltage converter should be transitioned to a desired operational mode and that can each transition the DC-DC voltage converter to the desired operational mode.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for controlling operational modes of a DC-DC voltage converter, the DC-DC voltage converter having a first bi-directional switch and a second bi-directional switch, the DC-DC voltage converter initially having an idle operational mode, the control system comprising:
    a microcontroller receiving a first operational mode message from a communication bus, the first operational mode message having a first operational mode value therein indicating that the DC-DC voltage converter is being commanded to transition to a first operational mode, the first operational mode not being the idle operational mode;
    the microcontroller having a first operational mode application and a second operational mode application;
    the first operational mode application determining a first encoded value based on the first operational mode value, and further determining first and second values based on the first encoded value;
    the second operational mode application determining a second encoded value based on the first operational mode value, and further determining third and fourth values based on the second encoded value; the second encoded value being different than the first encoded value;
    the first operational mode application inducing the DC-DC voltage converter to transition from the idle operational mode to the first operational mode if the second value is equal to the third value; and
    the second operational mode application inducing the DC-DC voltage converter to transition from the idle operational mode to the first operational mode if the first value is equal to the fourth value.

2. The control system of claim 1, wherein:
    the microcontroller has a memory device with first and second mode tables and the first and second check tables; the first mode table having a first record with a first encoded mode value therein, the second mode table having a first record with a first encoded mode value therein, the first check table having a first record with first and second check mode values therein, the second check table having a first record with first and second check mode values therein;

the first value being the first check mode value from the first record of the first check table; the second value being the second check mode value from the first record of the first check table; the third value being the first check mode value from the first record of the second check table; the fourth value being the second check mode value from the first record of the second check table;

the first encoded value being the first encoded mode value in the first record of the first mode table;

the second encoded value being the first encoded mode value in the first record of the second mode table;

the first operational mode application obtaining the first encoded mode value from the first record of the first mode table utilizing the first operational mode value;

the first operational mode application obtaining the first and second check mode values from the first record of the first check table utilizing the first encoded mode value from the first mode table;

the second operational mode application obtaining the first encoded mode value from the first record of the second mode table utilizing the first operational mode value;

the second operational mode application obtaining the first and second check mode values from the first record of the second check table utilizing the first encoded mode value from the second mode table; and the first operational mode application inducing the DC-DC voltage converter to transition from the idle operational mode to the first operational mode if the second check mode value from the first record of the first check table is equal to the first check mode value from the first record of the second check table.

3. The control system of claim 2, wherein the second operational mode application inducing the DC-DC voltage converter to transition from the idle operational mode to the first operational mode if the first check mode value from the first record of the first check table is equal to the second check mode value from the first record of the second check table.

4. The control system of claim 2, wherein:

the first operational mode application further determining if a lower nibble of the second check mode value from the first record of the first check table is equal to a lower nibble of the first check mode value from the first record of the second check table, and if so, then:

the microcontroller further receiving a first voltage signal from a first voltage sensor on a high voltage end of the second bi-directional switch;

the microcontroller further receiving a second voltage signal from a second voltage sensor on a low voltage end of the second bi-directional switch; and the first operational mode application further setting an open operational flag equal to a true value if a difference between the first and second voltage signals is greater than a first threshold voltage level indicating the second bi-directional switch has an open operational state.

5. The control system of claim 2, wherein the first and second check mode values from the first record of the first check table have a Hamming distance of two from one another.

6. The control system of claim 2, wherein the first and second check mode values from the first record of the second check table have a Hamming distance of two from one another.

7. The control system of claim 1, further comprising:

a contactor electrically coupled between a first battery and the first bi-directional switch of the DC-DC voltage converter; and the microcontroller operably coupled to the first bi-directional switch and the second bi-directional switch of the DC-DC voltage converter, and the contactor.

8. The control system of claim 7, wherein the idle operational mode corresponds to the first bi-directional switch being in an open operational state, and the second bi-directional switch being in the open operational state, and the contactor being in a closed operational state.

9. The control system of claim 7, wherein the first operational mode corresponds to a buck operational mode in which the first bi-directional switch has a closed operational state, and the second bi-directional switch has the closed operational state, and the contactor has the closed operational state.

10. The control system of claim 7, wherein the first operational mode corresponds to a buck special operational mode in which the first bi-directional switch has a closed operational state, and the second bi-directional switch has the closed operational state, and the contactor has an open operational state.

11. The control system of claim 7, wherein the first operational mode corresponds to a boost operational mode in which the first bi-directional switch has a closed operational state, and the second bi-directional switch has the closed operational state, and the contactor has the open operational state.

12. The control system of claim 7, wherein the first operational mode corresponds to an off operational mode in which the first bi-directional switch has an open operational state, and the second bi-directional switch has the open operational state, and the contactor has the open operational state.

13. The control system of claim 1, wherein the microcontroller has a memory device with first and second mode tables and the first and second check tables; the first mode table having a first record with a first encoded mode value therein, the second mode table having a first record with a first encoded mode value therein, the first check table having a first record with first and second check mode values therein, the second check table having a first record with first and second check mode values therein;

the first value being the first check mode value from the first record of the first check table; the second value being the second check mode value from the first record of the first check table; the third value being the first check mode value from the first record of the second check table; the fourth value being the second check mode value from the first record of the second check table;

the first encoded value being the first encoded mode value in the first record of the first mode table;

the second encoded value being the first encoded mode value in the first record of the second mode table;

the first operational mode application obtaining the first encoded mode value from the first record of the first mode table based on the first operational mode value;

the first operational mode application obtaining the first and second check mode values from the first record of the first check table utilizing the first encoded mode value from the first mode table;

the second operational mode application obtaining the first encoded mode value from the first record of the second mode table utilizing the first operational mode value;

the second operational mode application obtaining the first and second check mode values from the first record of the second check table utilizing the first encoded mode value from the second mode table; and the first operational mode application inducing the DC-DC voltage converter to remain in the idle operational mode if the second check mode value from the first record of the first check table is not equal to the first check mode value from the first record of the second check table.

14. The control system of claim 13, wherein the second operational mode application inducing the DC-DC voltage converter to remain in the idle operational mode if the first check mode value from the first record of the first check table is not equal to the second check mode value from the first record of the second check table.

15. The control system of claim 14, wherein the microcontroller further receiving a second operational mode message from the communication bus after receiving the first operational mode message, the second operational mode message having an idle operational mode value therein indicating that the DC-DC voltage converter is being commanded to transition to the idle operational mode;

the first mode table having a second record with a first encoded mode value therein, the second mode table having a second record with a first encoded mode value therein, the first check table having a second record with first and second check mode values therein, the second check table having a second record with first and second check mode values therein;

the first operational mode application obtaining the first encoded mode value from the second record in the first mode table utilizing the idle operational mode value;

the first operational mode application obtaining the first and second check mode values from the second record of the first check table utilizing the first encoded mode value from the second record of the first mode table;

the second operational mode application obtaining the first encoded mode value from the second record of the second mode table utilizing the idle operational mode value;

the second operational mode application obtaining the first and second check mode values from the second record of the second check table utilizing the first encoded mode value from the second record of the second mode table; and the first operational mode application inducing the DC-DC voltage converter to transition from the first operational mode to the idle operational mode if the second check mode value from the second record of the first check table is equal to the first check mode value from the second record of the second check table.

16. The control system of claim 15, wherein the second operational mode application inducing the DC-DC voltage converter to transition from the first operational mode to the idle operational mode if the first check mode value from the second record of the first check table is equal to the second check mode values from the second record of the second check table.

* * * * *